(12) United States Patent
Abrams et al.

(10) Patent No.: US 12,138,902 B2
(45) Date of Patent: Nov. 12, 2024

(54) LIGHT RETROREFLECTIVE GRAPHIC TEXTILE

(71) Applicant: Fiberlok Technologies, Fort Collins, CA (US)

(72) Inventors: Louis Brown Abrams, Fort Collins, CO (US); Andrew J. Steger, Fort Collins, CO (US)

(73) Assignee: Fiberlok Technologies, Fort Collins, CO (US)

( * ) Notice: Subject to any disclaimer, the term of this patent is extended or adjusted under 35 U.S.C. 154(b) by 1119 days.

(21) Appl. No.: 16/788,173

(22) Filed: Feb. 11, 2020

(65) Prior Publication Data

US 2020/0257024 A1  Aug. 13, 2020

Related U.S. Application Data

(60) Provisional application No. 62/804,030, filed on Feb. 11, 2019.

(51) Int. Cl.
*B32B 3/24* (2006.01)
*A41D 27/08* (2006.01)
(Continued)

(52) U.S. Cl.
CPC ............ *B32B 7/023* (2019.01); *A41D 27/085* (2013.01); *A41D 31/325* (2019.02); *B32B 3/266* (2013.01); *B32B 3/30* (2013.01); *B32B 5/024* (2013.01); *B32B 5/026* (2013.01); *B32B 5/16* (2013.01); *B32B 5/24* (2013.01); *B32B 5/26* (2013.01); *B32B 7/12* (2013.01); *B44F 1/02* (2013.01); *B44F 1/04* (2013.01); *B44F 1/045* (2013.01); *B44F 1/08* (2013.01); *C09J 7/29* (2018.01); *D06N 3/0068* (2013.01); *D06P 5/004* (2013.01); *G02B 5/12* (2013.01); *G02B 5/122* (2013.01);
(Continued)

(58) Field of Classification Search
None
See application file for complete search history.

(56) References Cited

U.S. PATENT DOCUMENTS

| | | | | |
|---|---|---|---|---|
| 1,905,989 A | * | 4/1933 | Safir | A41D 27/08 428/102 |
| 2,293,887 A | * | 8/1942 | Chamberlain | B44C 1/28 351/44 |

(Continued)

FOREIGN PATENT DOCUMENTS

| | | | | |
|---|---|---|---|---|
| CN | 102150965 A | * | 8/2011 | |
| CN | 104407407 A | * | 3/2015 | ........... B32B 17/061 |

(Continued)

OTHER PUBLICATIONS

Machine Translation of DE-8533472-U1, Jan. 1986 (Year: 1986).*

(Continued)

*Primary Examiner* — Jeffrey A Vonch
(74) *Attorney, Agent, or Firm* — Sheridan Ross P.C.

(57) ABSTRACT

A graphic comprises a textile material comprising one of a woven or knit textile having first and second textile surfaces in an opposing relationship and a retroreflective material having first and second surfaces in an opposing relationship. One of the first and second textile surfaces and one of the first and second surfaces are adhered to one another by a second adhesive.

28 Claims, 8 Drawing Sheets

(51) Int. Cl.
| | | |
|---|---|---|
| A41D 31/32 | (2019.01) | |
| B32B 3/26 | (2006.01) | |
| B32B 3/30 | (2006.01) | |
| B32B 5/02 | (2006.01) | |
| B32B 5/16 | (2006.01) | |
| B32B 5/24 | (2006.01) | |
| B32B 5/26 | (2006.01) | |
| B32B 7/023 | (2019.01) | |
| B32B 7/12 | (2006.01) | |
| B44F 1/02 | (2006.01) | |
| B44F 1/04 | (2006.01) | |
| B44F 1/08 | (2006.01) | |
| C09J 7/29 | (2018.01) | |
| D06N 3/00 | (2006.01) | |
| D06P 5/28 | (2006.01) | |
| G02B 5/12 | (2006.01) | |
| G02B 5/122 | (2006.01) | |
| G02B 5/124 | (2006.01) | |
| G02B 5/128 | (2006.01) | |
| G02B 5/136 | (2006.01) | |
| G09F 3/10 | (2006.01) | |
| A41D 13/01 | (2006.01) | |
| B32B 5/30 | (2006.01) | |
| B32B 37/12 | (2006.01) | |
| B32B 38/00 | (2006.01) | |
| B32B 38/14 | (2006.01) | |
| B44C 1/10 | (2006.01) | |
| B44C 3/00 | (2006.01) | |
| B44C 3/02 | (2006.01) | |
| C09J 7/21 | (2018.01) | |
| C09J 7/35 | (2018.01) | |
| D06Q 1/10 | (2006.01) | |
| D06Q 1/12 | (2006.01) | |
| G09F 3/02 | (2006.01) | |

(52) U.S. Cl.
CPC ............ *G02B 5/124* (2013.01); *G02B 5/128* (2013.01); *G02B 5/136* (2013.01); *G09F 3/10* (2013.01); *A41D 13/01* (2013.01); *A41D 27/08* (2013.01); *B32B 5/022* (2013.01); *B32B 5/30* (2013.01); *B32B 37/12* (2013.01); *B32B 38/14* (2013.01); *B32B 38/145* (2013.01); *B32B 2255/02* (2013.01); *B32B 2255/04* (2013.01); *B32B 2255/10* (2013.01); *B32B 2255/205* (2013.01); *B32B 2255/24* (2013.01); *B32B 2255/26* (2013.01); *B32B 2264/101* (2013.01); *B32B 2264/202* (2020.08); *B32B 2264/303* (2020.08); *B32B 2264/403* (2020.08); *B32B 2307/4023* (2013.01); *B32B 2307/4026* (2013.01); *B32B 2307/404* (2013.01); *B32B 2307/416* (2013.01); *B32B 2405/00* (2013.01); *B32B 2437/00* (2013.01); *B32B 2451/00* (2013.01); *B32B 2519/00* (2013.01); *B32B 2556/00* (2013.01); *B44C 1/105* (2013.01); *B44C 3/005* (2013.01); *B44C 3/025* (2013.01); *C09J 7/21* (2018.01); *C09J 7/35* (2018.01); *C09J 2203/334* (2013.01); *C09J 2203/358* (2020.08); *C09J 2301/18* (2020.08); *C09J 2301/304* (2020.08); *C09J 2400/143* (2013.01); *C09J 2400/163* (2013.01); *C09J 2400/263* (2013.01); *D06N 2209/0815* (2013.01); *D06N 2209/083* (2013.01); *D06N 2209/0876* (2013.01); *D06N 2211/22* (2013.01); *D06P 5/006* (2013.01); *D06Q 1/10* (2013.01); *D06Q 1/12* (2013.01); *D10B 2401/20* (2013.01); *G09F 2003/023* (2013.01); *G09F 2003/0239* (2013.01); *G09F 2003/025* (2013.01); *G09F 2003/0255* (2013.01); *G09F 2003/0258* (2013.01); *G09F 2003/0276* (2013.01); *G09F 2003/0282* (2013.01); *Y10S 428/9133* (2013.01); *Y10S 428/914* (2013.01); *Y10T 428/24298* (2015.01); *Y10T 428/24322* (2015.01); *Y10T 428/24331* (2015.01); *Y10T 428/2457* (2015.01); *Y10T 428/2481* (2015.01); *Y10T 428/24843* (2015.01); *Y10T 428/24942* (2015.01); *Y10T 428/252* (2015.01); *Y10T 428/31* (2015.01); *Y10T 442/30* (2015.04); *Y10T 442/40* (2015.04); *Y10T 442/60* (2015.04)

(56) References Cited

U.S. PATENT DOCUMENTS

| | | | | |
|---|---|---|---|---|
| 2,567,233 | A * | 9/1951 | Palmquist | D06M 15/41 |
| | | | | 442/72 |
| 3,420,597 | A | 1/1969 | Nellessen et al. | |
| 3,684,348 | A * | 8/1972 | Rowland | G02B 5/124 |
| | | | | 359/530 |
| 3,801,183 | A | 4/1974 | Sevelin et al. | |
| 3,852,145 | A * | 12/1974 | Kloweit | B44F 7/00 |
| | | | | 40/616 |
| 3,971,692 | A * | 7/1976 | Anderson | B32B 7/06 |
| | | | | 427/199 |
| 4,102,562 | A * | 7/1978 | Harper | B82Y 30/00 |
| | | | | 359/518 |
| 4,103,060 | A * | 7/1978 | Bingham | G02B 5/128 |
| | | | | 427/205 |
| 4,264,666 | A * | 4/1981 | Hix | D06Q 1/00 |
| | | | | 40/586 |
| 4,656,072 | A * | 4/1987 | Coburn, Jr. | G02B 5/12 |
| | | | | 428/41.6 |
| 4,980,216 | A * | 12/1990 | Rompp | B60R 22/321 |
| | | | | 428/200 |
| 5,110,655 | A * | 5/1992 | Engler | G08B 5/004 |
| | | | | 2/5 |
| 5,128,804 | A * | 7/1992 | Lightle | G02B 5/128 |
| | | | | 442/132 |
| 5,200,262 | A * | 4/1993 | Li | G02B 5/128 |
| | | | | 442/379 |
| 5,207,851 | A | 5/1993 | Abrams | |
| 5,207,852 | A * | 5/1993 | Lightle | D04H 3/16 |
| | | | | 156/303.1 |
| 5,220,633 | A * | 6/1993 | Selinger | B44F 1/00 |
| | | | | 501/86 |
| 5,229,882 | A * | 7/1993 | Rowland | B29D 11/00605 |
| | | | | 156/247 |
| 5,272,562 | A | 12/1993 | Coderre | |
| 5,344,705 | A * | 9/1994 | Olsen | B44C 1/1716 |
| | | | | 428/207 |
| 5,346,746 | A | 9/1994 | Abrams | |
| 5,407,729 | A * | 4/1995 | Verden | G03H 1/0236 |
| | | | | 428/196 |
| 5,503,906 | A * | 4/1996 | Olsen | D06Q 1/12 |
| | | | | 428/323 |
| 5,588,156 | A * | 12/1996 | Panton, Jr. | A41D 27/085 |
| | | | | 2/244 |
| 5,597,434 | A * | 1/1997 | Kukoff | B32B 3/08 |
| | | | | 156/240 |
| 5,597,637 | A | 1/1997 | Abrams et al. | |
| 5,612,119 | A * | 3/1997 | Olsen | G02B 5/128 |
| | | | | 428/407 |
| 5,614,286 | A * | 3/1997 | Bacon, Jr | B29C 39/148 |
| | | | | 359/530 |
| 5,631,064 | A * | 5/1997 | Marecki | G02B 5/128 |
| | | | | 359/518 |
| 5,635,001 | A * | 6/1997 | Mahn, Jr. | B32B 27/12 |
| | | | | 156/290 |

(56) References Cited

U.S. PATENT DOCUMENTS

| | | | | |
|---|---|---|---|---|
| 5,637,173 A * | 6/1997 | Martin | G02B 5/124 | 156/289 |
| 5,656,360 A * | 8/1997 | Faykish | G02B 5/124 | 428/323 |
| 5,674,605 A * | 10/1997 | Marecki | D06Q 1/12 | 359/518 |
| 5,738,746 A * | 4/1998 | Billingsley | G02B 5/128 | 359/518 |
| 5,786,066 A * | 7/1998 | Martin | G02B 5/124 | 359/530 |
| 5,858,156 A | 1/1999 | Abrams et al. | | |
| 5,898,523 A * | 4/1999 | Smith | G02B 5/124 | 359/530 |
| 5,914,176 A * | 6/1999 | Myers | D06Q 1/12 | 156/72 |
| 5,945,201 A * | 8/1999 | Holat | B44C 1/105 | 430/1 |
| 5,962,108 A * | 10/1999 | Nestegard | B32B 38/0008 | 359/530 |
| 5,974,997 A * | 11/1999 | Amburgey | A41D 27/08 | 112/475.08 |
| 6,010,764 A | 1/2000 | Abrams | | |
| 6,060,157 A * | 5/2000 | LaPerre | G02B 5/128 | 428/913 |
| 6,083,332 A | 7/2000 | Abrams | | |
| 6,110,558 A * | 8/2000 | Billingsley | A41D 13/01 | 359/518 |
| 6,110,560 A * | 8/2000 | Abrams | D06Q 1/14 | 428/94 |
| 6,119,751 A * | 9/2000 | Nilsen | G02B 5/124 | 359/530 |
| 6,153,128 A * | 11/2000 | Lightle | A41D 13/01 | 427/163.4 |
| 6,376,045 B1 * | 4/2002 | Wong | C09J 7/29 | 359/538 |
| 6,586,067 B2 | 7/2003 | Levenstein | | |
| 6,656,566 B1 * | 12/2003 | Kuykendall | G02B 5/128 | 359/530 |
| 6,718,895 B1 * | 4/2004 | Fortuna | D05C 17/00 | 112/475.19 |
| 7,344,769 B1 | 3/2008 | Abrams | | |
| 7,351,368 B2 | 4/2008 | Abrams | | |
| 7,364,782 B2 | 4/2008 | Abrams | | |
| 7,381,284 B2 | 6/2008 | Abrams | | |
| 7,390,552 B2 | 6/2008 | Abrams | | |
| 7,393,576 B2 | 7/2008 | Abrams | | |
| 7,402,222 B2 | 7/2008 | Abrams | | |
| 7,410,682 B2 | 8/2008 | Abrams | | |
| 7,413,581 B2 | 8/2008 | Abrams | | |
| 7,465,485 B2 | 12/2008 | Abrams | | |
| 7,632,371 B2 | 12/2009 | Abrams | | |
| 7,799,164 B2 | 9/2010 | Abrams | | |
| 8,007,889 B2 | 8/2011 | Abrams | | |
| 8,206,800 B2 | 6/2012 | Abrams | | |
| 8,288,940 B2 | 10/2012 | Hehenberger | | |
| 8,470,394 B2 | 6/2013 | Koppes et al. | | |
| 8,475,905 B2 | 7/2013 | Abrams | | |
| 9,012,005 B2 | 4/2015 | Abrams | | |
| 9,175,436 B2 | 11/2015 | Abrams | | |
| 9,180,728 B2 | 11/2015 | Abrams | | |
| 9,180,729 B2 | 11/2015 | Abrams | | |
| 9,193,214 B2 | 11/2015 | Abrams | | |
| 9,248,470 B2 | 2/2016 | Koppes et al. | | |
| 9,658,371 B2 | 5/2017 | Buoni | | |
| D802,941 S * | 11/2017 | Hodges | D5/63 | |
| 9,849,652 B2 | 12/2017 | Abrams | | |
| 2002/0012761 A1 * | 1/2002 | Carlson | C09J 7/29 | 156/215 |
| 2002/0028311 A1 * | 3/2002 | Coppens | G09F 3/10 | 428/141 |
| 2002/0066864 A1 * | 6/2002 | Reshef | F41J 1/00 | 250/398 |
| 2002/0094411 A1 * | 7/2002 | Weiss | A41D 27/08 | 428/102 |
| 2002/0145805 A1 * | 10/2002 | Hall | G08B 5/004 | 362/519 |
| 2003/0019009 A1 * | 1/2003 | Feduzi | A41D 31/32 | 2/69 |
| 2003/0072889 A1 * | 4/2003 | Abrams | D06Q 1/14 | 427/458 |
| 2003/0129359 A1 * | 7/2003 | Demott | G02B 5/18 | 428/141 |
| 2003/0150043 A1 * | 8/2003 | Koppes | A41D 13/01 | 2/69 |
| 2003/0182705 A1 * | 10/2003 | Spongberg | A41D 1/00 | 2/69 |
| 2004/0091658 A1 * | 5/2004 | Ginkel | G09F 3/10 | 428/40.1 |
| 2004/0261295 A1 * | 12/2004 | Meschter | B44B 3/009 | 36/55 |
| 2005/0037844 A1 * | 2/2005 | Shum | A63F 13/212 | 463/36 |
| 2005/0090928 A1 * | 4/2005 | Gibson | D06P 5/003 | 700/133 |
| 2005/0243420 A1 * | 11/2005 | Collier | A41D 27/085 | 359/536 |
| 2005/0268407 A1 | 12/2005 | Abrams | | |
| 2006/0051559 A1 * | 3/2006 | Sleeman | D06Q 1/12 | 428/143 |
| 2006/0072198 A1 * | 4/2006 | Parisi | D06Q 1/12 | 359/536 |
| 2006/0076107 A1 * | 4/2006 | Liu | G09F 3/04 | 264/257 |
| 2006/0216455 A1 * | 9/2006 | Soaft | B32B 27/36 | 428/323 |
| 2006/0237124 A1 * | 10/2006 | Bartoli | B44F 1/02 | 156/247 |
| 2006/0246802 A1 * | 11/2006 | Hughes | B32B 5/26 | 442/268 |
| 2007/0022548 A1 | 2/2007 | Abrams | | |
| 2007/0110949 A1 | 5/2007 | Abrams | | |
| 2007/0148397 A1 | 6/2007 | Abrams | | |
| 2007/0162176 A1 * | 7/2007 | Peyser | A41D 27/08 | 700/138 |
| 2007/0289688 A1 | 12/2007 | Abrams | | |
| 2008/0003399 A1 | 1/2008 | Abrams | | |
| 2008/0006968 A1 | 1/2008 | Abrams | | |
| 2008/0026193 A1 * | 1/2008 | Koppes | B05D 7/50 | 428/207 |
| 2008/0030854 A1 * | 2/2008 | Hews | C09J 5/06 | 359/518 |
| 2008/0030856 A1 * | 2/2008 | King | A41D 13/01 | 359/518 |
| 2008/0050548 A1 | 2/2008 | Abrams | | |
| 2008/0095973 A1 | 4/2008 | Abrams | | |
| 2008/0102239 A1 | 5/2008 | Abrams | | |
| 2008/0111047 A1 | 5/2008 | Abrams | | |
| 2008/0145585 A1 | 6/2008 | Abrams | | |
| 2008/0152796 A1 * | 6/2008 | Collier | D06Q 1/12 | 427/148 |
| 2008/0182088 A1 * | 7/2008 | Shih | B32B 25/00 | 428/200 |
| 2008/0302772 A1 * | 12/2008 | Lion | D06Q 1/10 | 219/121.72 |
| 2009/0065583 A1 * | 3/2009 | McGrew | G01N 21/643 | 235/491 |
| 2009/0075075 A1 * | 3/2009 | Abrams | D06Q 1/00 | 428/354 |
| 2009/0142486 A1 * | 6/2009 | Hannington | G02B 5/128 | 264/293 |
| 2009/0239025 A1 | 9/2009 | Abrams | | |
| 2009/0241234 A1 * | 10/2009 | Coles | A41D 13/01 | 2/244 |
| 2010/0053754 A1 * | 3/2010 | Chapman | G02B 5/124 | 359/530 |
| 2010/0068447 A1 | 3/2010 | Abrams | | |
| 2010/0092720 A1 * | 4/2010 | Abrams | D06Q 1/14 | 156/62.2 |

(56) References Cited

U.S. PATENT DOCUMENTS

| | | | |
|---|---|---|---|
| 2010/0143669 A1 | 6/2010 | Abrams | |
| 2010/0159185 A1* | 6/2010 | Cremin | D06Q 1/00 |
| | | | 156/72 |
| 2010/0233410 A1 | 9/2010 | Abrams | |
| 2010/0251455 A1* | 10/2010 | Lampe | A41D 1/06 |
| | | | 2/159 |
| 2010/0316832 A1 | 12/2010 | Abrams | |
| 2011/0008618 A1* | 1/2011 | Weedlun | B44C 1/228 |
| | | | 156/267 |
| 2011/0014837 A1* | 1/2011 | Baqai | B32B 5/024 |
| | | | 442/151 |
| 2011/0020586 A1* | 1/2011 | Poulus | C09J 7/21 |
| | | | 442/151 |
| 2011/0052859 A1 | 3/2011 | Abrams | |
| 2011/0070409 A1* | 3/2011 | Nishimaki | C09J 7/29 |
| | | | 156/313 |
| 2011/0102897 A1* | 5/2011 | Schumacher | B44F 1/045 |
| | | | 359/516 |
| 2011/0228393 A1* | 9/2011 | Caswell | G02B 21/367 |
| | | | 359/530 |
| 2011/0255165 A1* | 10/2011 | Smith | C25D 7/08 |
| | | | 359/530 |
| 2012/0028003 A1* | 2/2012 | Abrams | B44C 1/105 |
| | | | 428/196 |
| 2012/0141698 A1* | 6/2012 | OLeary | B32B 27/08 |
| | | | 427/256 |
| 2012/0298025 A1* | 11/2012 | Kaufmann | B32B 7/12 |
| | | | 112/400 |
| 2013/0078413 A1* | 3/2013 | Abrams | B32B 37/025 |
| | | | 156/306.6 |
| 2013/0115408 A1 | 5/2013 | Abrams | |
| 2013/0135731 A1* | 5/2013 | Smith | B32B 27/42 |
| | | | 427/163.4 |
| 2014/0022641 A1* | 1/2014 | Yoon | G02B 5/128 |
| | | | 359/538 |
| 2014/0050899 A1* | 2/2014 | Kukoff | B32B 38/10 |
| | | | 216/7 |
| 2014/0093707 A1* | 4/2014 | Kaufmann | D06Q 1/00 |
| | | | 156/230 |
| 2014/0099483 A1* | 4/2014 | Weber | B44C 1/1725 |
| | | | 428/206 |
| 2014/0106139 A1* | 4/2014 | Abrams | B29C 59/16 |
| | | | 428/200 |
| 2014/0118827 A1* | 5/2014 | Zhang | A41D 13/01 |
| | | | 359/518 |
| 2014/0202614 A1* | 7/2014 | Whitley | B44C 1/16 |
| | | | 156/64 |
| 2014/0349079 A1* | 11/2014 | Chandrasekaran | A61F 13/625 |
| | | | 24/442 |
| 2015/0010723 A1* | 1/2015 | Krishnan | B32B 27/20 |
| | | | 428/40.2 |
| 2015/0056400 A1* | 2/2015 | Abrams | B44C 1/26 |
| | | | 156/252 |
| 2015/0099099 A1* | 4/2015 | Weedlun | D06Q 1/00 |
| | | | 156/263 |
| 2015/0129105 A1 | 5/2015 | Abrams | |
| 2015/0140275 A1 | 5/2015 | Abrams | |
| 2015/0147491 A1* | 5/2015 | De Backer | B32B 3/06 |
| | | | 156/230 |
| 2015/0168614 A1* | 6/2015 | Running | G02B 5/124 |
| | | | 359/530 |
| 2015/0212243 A1* | 7/2015 | Oldknow | G02B 5/124 |
| | | | 206/315.3 |
| 2015/0306843 A1* | 10/2015 | White | B32B 5/22 |
| | | | 156/269 |
| 2016/0021946 A1* | 1/2016 | White | G02B 5/128 |
| | | | 359/518 |
| 2016/0044977 A1* | 2/2016 | Kronenberger | A42B 1/248 |
| | | | 428/189 |
| 2016/0097886 A1* | 4/2016 | Hwang | B44F 1/045 |
| | | | 359/540 |
| 2016/0101601 A1* | 4/2016 | Abrams | B32B 27/40 |
| | | | 264/400 |
| 2016/0201240 A1* | 7/2016 | Scott | D05B 19/16 |
| | | | 112/475.19 |
| 2016/0366954 A1* | 12/2016 | Barkshire | A41D 27/085 |
| 2017/0205545 A1* | 7/2017 | Rowbottom | A41D 13/01 |
| 2017/0212284 A1* | 7/2017 | Wang | B32B 38/18 |
| 2017/0293056 A1* | 10/2017 | Chen-Ho | G02B 5/128 |
| 2018/0027906 A1* | 2/2018 | Asayama | A41D 27/085 |
| 2018/0074237 A1* | 3/2018 | Yoon | G02B 1/14 |
| 2018/0074238 A1* | 3/2018 | Yoon | B32B 27/302 |
| 2018/0117863 A1 | 5/2018 | Smith et al. | |
| 2018/0169996 A1* | 6/2018 | Wolk | B32B 27/12 |
| 2018/0180779 A1 | 6/2018 | Free et al. | |
| 2019/0070879 A1* | 3/2019 | Mon | B44F 1/10 |
| 2019/0084345 A1* | 3/2019 | Shigeta | B44F 1/02 |
| 2019/0170916 A1* | 6/2019 | Nishimura | A41D 13/01 |
| 2019/0187345 A1* | 6/2019 | Gold | G02B 5/136 |
| 2020/0209442 A1* | 7/2020 | Gold | B32B 5/022 |
| 2020/0215792 A1* | 7/2020 | Hart | B32B 27/304 |
| 2020/0220248 A1* | 7/2020 | Verlinden | H01Q 9/0407 |
| 2020/0352280 A1* | 11/2020 | Engel | D04H 1/413 |
| 2021/0282483 A1* | 9/2021 | Lanternari | A41D 31/325 |

FOREIGN PATENT DOCUMENTS

| | | | | |
|---|---|---|---|---|
| CN | 104880752 A | * | 9/2015 | |
| DE | 8533472 U1 | * | 1/1986 | |
| DE | 202012004624 U1 | * | 10/2013 | A41D 13/01 |
| DE | 202018102330 U1 | * | 6/2018 | |
| DE | 202018104353 U1 | * | 9/2018 | |
| EP | 354884 A2 | * | 2/1990 | D06Q 1/14 |
| EP | 1584738 A1 | * | 10/2005 | D06Q 1/10 |
| EP | 1974621 A2 | * | 10/2008 | A41D 13/01 |
| EP | 2211207 A1 | * | 7/2010 | B29D 11/00605 |
| EP | 2517585 A1 | * | 10/2012 | A41D 13/01 |
| FR | 2805289 A1 | * | 8/2001 | A41D 27/08 |
| FR | 2857294 A1 | * | 1/2005 | A41D 27/08 |
| FR | 2944193 A1 | * | 10/2010 | A41D 13/01 |
| FR | 2988568 A1 | * | 10/2013 | A41D 13/01 |
| GB | 2211143 A | * | 6/1989 | D06Q 1/12 |
| GB | 2245742 A | * | 1/1992 | G09F 13/16 |
| GB | 2339956 A | * | 2/2000 | G09F 17/00 |
| GB | 2535733 A | * | 8/2016 | B41M 3/12 |
| JP | 52017587 A | * | 2/1977 | |
| JP | 02140703 A | * | 5/1990 | |
| JP | 08035148 A | * | 2/1996 | |
| JP | 2000238214 A | * | 9/2000 | |
| JP | 2002105708 A | * | 4/2002 | |
| JP | 2002309416 A | * | 10/2002 | A41D 31/32 |
| JP | 2002371416 A | * | 12/2002 | |
| JP | 3093638 U | * | 11/2005 | |
| JP | 2006249646 A | * | 9/2006 | |
| JP | 2008008986 A | * | 1/2008 | |
| JP | 3164929 U | * | 12/2010 | |
| JP | 2012162829 A | * | 8/2012 | |
| JP | 2012242531 A | * | 12/2012 | |
| JP | 2013020169 A | * | 1/2013 | |
| JP | 3198747 U | * | 7/2015 | |
| KR | 200211949 Y1 | * | 2/2001 | |
| KR | 200214664 Y1 | * | 2/2001 | |
| KR | 200304350 Y1 | * | 2/2003 | |
| KR | 2003079478 A | * | 10/2003 | G02B 5/128 |
| KR | 2004072802 A | * | 8/2004 | B32B 27/06 |
| KR | 200401627 Y1 | * | 11/2005 | |
| KR | 2006021249 A | * | 3/2006 | A41D 13/01 |
| KR | 2008003492 U | * | 8/2008 | |
| KR | 2008080741 A | * | 9/2008 | B41F 15/02 |
| KR | 2010006584 U | * | 6/2010 | |
| KR | 2010089379 A | * | 8/2010 | |
| KR | 2011006611 U | * | 6/2011 | |
| KR | 1048807 B1 | * | 7/2011 | |
| KR | 2014023211 A | * | 2/2014 | |
| KR | 2017029290 A | * | 3/2017 | B41M 1/00 |
| KR | 2017003741 U | * | 10/2017 | A41D 27/085 |
| WO | WO-8000462 A1 | * | 3/1980 | D06Q 1/12 |
| WO | WO-8808793 A1 | * | 11/1988 | B41M 3/12 |
| WO | WO-9419530 A1 | * | 9/1994 | D06Q 1/14 |
| WO | WO-9425666 A1 | * | 11/1994 | B44C 1/1716 |

(56) References Cited

FOREIGN PATENT DOCUMENTS

| WO | WO-9701776 A1 | * | 1/1997 | ............ G02B 5/128 |
|---|---|---|---|---|
| WO | WO-0043813 A1 | * | 7/2000 | ............ A42B 3/061 |
| WO | WO-2004113970 A1 | * | 12/2004 | ........ A41D 31/0094 |
| WO | WO-2006128420 A1 | * | 12/2006 | ............ A41D 13/01 |
| WO | WO-2007046157 A1 | * | 4/2007 | ............ G02B 5/128 |
| WO | WO-2008016716 A2 | * | 2/2008 | ............ A41D 13/01 |
| WO | WO-2011156930 A1 | * | 12/2011 | ............ A41D 13/01 |
| WO | WO-2015030770 A1 | * | 3/2015 | ............... D06Q 1/10 |
| WO | WO 2017/004247 | | 1/2017 | |
| WO | WO 2018/217519 | | 11/2018 | |

OTHER PUBLICATIONS

Machine Translation of JP-2002371416-A, Dec. 2002 (Year: 2002).*
Cole, History of Reflective Tape, Jan. 2016, All About Reflective Tape, <https://reflectivetape.info/history_of_reflective_tape/> (Year: 2016).*
Machine Translation of JP-02140703-A, May 1990 (Year: 1990).*
Robo Murray Airsoft, Robo-Airsoft: Robo Gear Review—Perroz Designs IR Nationality Gen 2 Patches, Dec. 15, 2014, <https://www.youtube.com/watch?v=qob2RvHwcug> (Year: 2014).*
Cole, History of Reflective Tape—Who Invented Retro Reflective Tape?, Jan. 11, 2016, Reflective Tape Information Site (Year: 2016).*
3M™ Scotchlite™ Reflective Material SOLAS Grade Products, Jun. 2016 (Year: 2016).*
U.S. Appl. No. 29/058,551, filed Aug. 19, 1996, Abrams.
U.S. Appl. No. 09/548,839, filed Apr. 13, 2000, Abrams.
U.S. Appl. No. 10/371,640, filed Feb. 21, 2003, Abrams.
U.S. Appl. No. 10/613,982, filed Jul. 3, 2003, Abrams.
U.S. Appl. No. 10/961,821, filed Oct. 7, 2004, Abrams.
International Search Report and Written Opinion for International (PCT) Patent Application No. PCT/US2020/017774, dated Apr. 29, 2020 18 pages.
International Preliminary Report on Patentability for International (PCT) Patent Application No. PCT/US2020/017774, dated Aug. 26, 2021 13 pages.

* cited by examiner

LIGHT RETROREFLECTIVE GRAPHIC TEXTILE

CROSS REFERENCE TO RELATED APPLICATION

The present application claims the benefits of U.S. Provisional Application Ser. No. 62/804,030, filed Feb. 11, 2019, entitled "LIGHT REFLECTIVE TEXTILE" all of which are hereby incorporated herein by this reference in their entirety.

FIELD

The disclosure relates generally to decorative graphics and particularly to decorative appliqués comprising retroreflective materials.

BACKGROUND

Dimensional and textured applied graphics products can add value to a large range of substrates and imprinted products. Unlike dimensional and textured graphics, "flat graphics" made from printing of inks tend to have a low or cheap perceived value to consumers. The product category for imprinted textile products has been dominated by embroidered (stitched) technologies for many decades.

Examples of dimensional and textured applied graphics include Lextra™, a flocked graphic, Tackleknit™, a textured knit fabric appliqué, and ChromaFlex™, a molded metallized graphic, all manufactured by FiberLok or at its specification and/or direction. Added values include dimension, complexity, precision of accurate reproduction of original image/logo design and/or colors—all features adding to value of graphic textile and decorated final product.

SUMMARY

These and other needs are addressed by the various embodiments and configurations of the present disclosure. The present disclosure is directed generally to retroreflective graphics, such as appliqués, stickers, patches, and heat transfers and other textile and methods and/or systems for making the same.

In some embodiments of the present disclosure, a graphic, such as an appliqué, includes a textile material comprising one of a woven, non-woven (e.g., flock), or knit textile having first and second textile surfaces in an opposing relationship and a retroreflective material having first and second surfaces in an opposing relationship. One of the first and second textile surfaces and one of the first and second surfaces are adhered to one another by a second adhesive.

In some embodiments of the present disclosure is a graphic that includes a textile material comprising one of a woven, non-woven, or knit textile having first and second textile surfaces in an opposing relationship and a retroreflective material having first and second surfaces in an opposing relationship. One of the first and second textile surfaces and one of the first and second surfaces may be adhered to one another by a second adhesive. The first textile surface has textile coefficient of retroreflection ($R_A$) and the first surface of the retroreflective material has a retroreflective $R_A$, each of the textile and retroreflective $R_A$ being measured for an observation angle of 0.2 degrees and an entrance angle of −4 degrees. The textile $R_A$ is no more than about 75% of the retroreflective $R_A$.

In some embodiments of the present disclosure is a graphic that includes a textile material comprising one of a woven, non-woven, or knit textile having first and second textile surfaces in an opposing relationship and a retroreflective material having first and second surfaces in an opposing relationship. One of the first and second textile surfaces and one of the first and second surfaces may be adhered to one another by a second adhesive. For incident visible light at an entrance angle of −4 degrees, a total light return of the first surface of the retroreflective material is at least about 25% greater than a total light return of the first textile surface.

The graphic can have a coefficient of retroreflection ($R_A$) less than 40 cd/(lux·m$^2$) and the first surface of the retroreflective material can have an $R_A$ not less than 40 cd/(lux·m$^2$), wherein the $R_A$ is measured for an observation angle of 0.2 degrees and an entrance angle of −4 degrees.

The textile material can be a woven textile.

The textile material can be a knit textile.

The textile can be a sublimation dyed textile material.

The retroreflective material can include a plurality of optically transmissive beads having a first bead surface and a second bead surface, wherein the first bead surface is free of a metallized layer and the second bead surface comprises a metallized layer, and wherein the first bead surface faces a viewer of the graphic.

A mean diameter of the beads can be from about 15 to about 85 microns.

The beads can have a refractive index ranging from about 1.5 to about 3.

The retroreflective material can include a cube corner sheeting having a first sheeting surface and a second sheeting surface, wherein the first sheeting surface is free of a metallized layer and the second sheeting surface comprises a metallized layer, and wherein the first sheeting surface faces a viewer of the graphic.

The first textile surface can have a coefficient of retroreflection ($R_A$) of no more than about 10 cd/(lux·m$^2$) and the first surface of the retroreflective material can have an $R_A$ not less than about 70 cd/(lux·m$^2$).

The first textile surface can have a coefficient of retroreflection ($R_A$) of no more than about 20 cd/(lux·m$^2$) and the first surface of the retroreflective material has an $R_A$ not less than about 50 cd/(lux·m$^2$).

For incident visible light at an entrance angle of −4 degrees, a total light return of the retroreflective material can be not less than about 8% and a total light return of the first textile surface can be less than 5%.

The second surface of the retroreflective material can be adhered by the adhesive to the first textile surface. The adhesive can therefore be located between the second surface of the retroreflective material and the first textile surface, wherein the first textile surface is not viewable in areas of overlap between the retroreflective and textile materials, wherein the retroreflective material is discontinuous, and wherein the first textile surface is viewable through the discontinuity of the retroreflective material.

The adhesive can be located between the first surface of the retroreflective material and the second textile surface, wherein the first surface is not viewable in areas of overlap between the retroreflective and textile materials, wherein the textile material is discontinuous, and wherein the first surface is viewable through the discontinuity of the textile material.

In some embodiments, the retroreflective material can comprise a colorization overlayer to provide a selected color or reflected wavelength distribution.

The novel graphics of this disclosure can use a knit or woven textile, dye sublimation color in the knit or woven textile, and retroreflective material to provide highly attractive imprinted products, such as appliques, stickers, sew-on badges or emblems, heat-applied graphics, and the like.

The dimensional and textured graphic of the present disclosure can synergistically combine the properties of knit and woven textiles with retroreflective materials to provide a product having a variety of applications and higher perceived and functional (reflective) value to consumers. The location of the retroreflective material adjacent to a non-retroreflective and textured knit or woven textile can more accurately reproduce the graphic design and provide higher levels of viewer perceived light reflectance or brightness of incident light and therefore higher level of visibility in low light conditions, such as during nighttime, while also accurately reproducing the graphic design and specified colors and providing a highly attractive and authentically reproduced graphic during higher light conditions, such as during daytime. Retroreflective materials simply applied in isolation to an item of clothing, roadside sign, vehicle, or other driving surface, can have the appearance of being flat, not-textured and being a lower value graphics offering less visual impact, especially when viewed in daylight. While it is possible to form multi-colored images by assembling pre-colored cut materials of retroreflective material into the desired overall design and shape and incorporating into the assembly non-reflective vinyl, polyurethane, silicone and other films, the resulting graphic not only fails to accurately reproduce finely-detailed graphic design elements or specifically color-matched images such as corporate logos but also lacks the three-dimensional mixed-media appearance from combining graphic components having different textures, particularly the rich texture of knit or woven fabrics. Such retroreflective graphics can lack the ability to accurately reproduce and project a high perceived value textured image as attractively and faithfully to reproduce the original graphic design not only in daylight but also in the dark when reflecting incident light. This is so because the ability of the retroreflective material to produce matched color or fine design details is limited or not possible. The dimensional and textured graphics of the present disclosure, in contrast, can provide not only a retroreflective graphic providing higher levels of visibility and safety under low light conditions but also a graphic having a higher perceived value to viewers and more attractive presentation of brand logos and other graphics. The dimensional and textured graphics can provide a higher level of brand integrity by yielding more faithfully an image and specified-color reproduction of the authentic original design. The graphic's combination of the textured textile with the retroreflective material uses dissimilar materials to provide a dimensionalized mixed-media having a higher visual and functional (reflective) impact on viewers. In short, the dimensionalized and textured graphics of the present disclosure provide an entirely new category of retroreflective graphics products.

The appliqué can have other advantages. The graphics of the present disclosure can incorporate finely-detailed and textured design elements and color match design elements as available colors are not limited to a range of "stock" colors as with embroidery threads (making it impractical to match colors for specific logos). The various materials in the graphic can be resistant to wear, weather, washing, and other sources of wear and abrasion When a thicker more-durable textile is combined with a thinner less-durable reflective bead coated material, the greater thickness of more-durable material can protect glass beads from abrasion. By selecting carefully the various materials for the various layers in the graphic, one can create a dimensional graphic. The graphic can transform the value of embellishment by sublimation dye transfer printing into a new category of up-market and higher perceived value dimensionalized products. Sublimation printing can be used to provide precise design and color reproduction and the applique textile and/or yarns can produce an embroidery-like high luster appearance having a higher added-value look of dimension, texture, and design depth. Surface texture, for example, can be imparted using a ribbed or jacquard knit fabric, which is further coupled with a printed design to produce an integrated multi-dimensional effect.

In some configurations, each adhesive layer can perform a beneficial and synergistic function. The first adhesive can be formulated so as not to flow too deeply into the textile, and the second or third adhesive can be formulated so as not to flow too deeply into the article to be decorated, thereby preserving the integrity of the article to be decorated.

These and other advantages will be apparent from the disclosure of the disclosure contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Knit" refers to a fabric having a series of connected loops. The loops are generally made by intertwining yarn, thread, or strips in a series of consecutive loops, called stitches. As each row progresses, a new loop is pulled through an existing loop. The loops are generally easily stretched in different directions. Knitting normally uses one set of yarn which is worked either horizontally or vertically, not both. Knitting typically has two recognized knitting structures, namely warp and weft knitting. Warp knitting has one set of yarn for each wale, each yarn travelling vertically. Weft knitting has one set of yarn, which travels horizontally across the fabric.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

"Retroreflective" refers to a property of a structure that causes retroflection of light, or reflex reflection of light, by which incident light returns back towards its source in a brilliant cone with the axis of the cone essentially common with the incident beam of light, even though the incident beam strikes the retroreflective structure at an angle other than normal to the surface of the structure.

"Woven" refers to a fabric comprising at least two sets of yarn, thread, or strips, one warp (longitudinal) and one filling yarn, thread, or strip (transverse or crosswise), normally laced at substantially right angles to each other. Commonly, the yarn, thread, or strips are straight, run parallel either lengthwise (warp threads) or crosswise (weft threads). The weft yarn is commonly interlocked with the warp by passing under then over, one or more warp threads. In comparison, yarn, thread, or strips in knit fabrics commonly follow a meandering path (a course), forming substantially symmetric loops (also called bights) substantially symmetrically above and below the mean path of the yarn, thread, or strips. The meandering loops can be stretched easily in different directions, which generally give knitting much more elasticity than woven fabrics. Depending on the yarn content and knitting pattern, knit fabrics can stretch as much as 500% or more. In contrast, woven fabrics stretch primarily along one direction (the bias) and are not as elastic, although elasticity can be increased when they are woven from yarn containing elastomeric yarn such as elastane (Lycra® from Invista or Dorlastan® from Bayer).

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate typical and alternative examples of how the disclosure can be made and used and are not to be construed as limiting the disclosure to only the illustrated and described examples. Further features and advantages will become apparent from the following, more detailed, description of the various embodiments of the disclosure, as illustrated by the drawings referenced below.

DETAILED DESCRIPTION

In embodiments of the present disclosure, a dimensional and textured applied graphic product includes a knit or woven textile material and a retroreflective material. The graphic product can have a one-piece construction that may be applied in one simple heat-seal or sew-on or sticker application.

In some embodiments, the graphic comprises a first high-reflective-value layer, typically a retroreflective material (e.g., a glass bead and metal-type retroreflective media such as 3M™ Scotchlite™) with a thermoplastic or other type of adhesive backing and a second textured layer comprising a textured knit or woven textile with a thermoplastic or other type of adhesive backing that has been dyed or imprinted such as by vat dye coloring or textile printing technologies (e.g., direct screen or digital, dye sublimation direct or heat transfer, etc.). The first and second layers are assembled and held together by known techniques, such as by heat sealing the first and second layers together or by being mounted temporarily onto a transfer sheet by thermoplastic or pressure-sensitive release adhesives. An additional or third adhesive layer can be combined with the first and second layers for the purposes of enabling adhesion one to another and/or to enable them to ultimately be heat laminated to the final surface being imprinted.

In some embodiments, voids or openings are created or cut into the uppermost of the first or second layer so that the lower of the first or second layer can be viewed to create a desirable three-dimensional or mixed-media type effect. Typically, the retroreflective first layer is positioned uppermost and the textile second layer lowermost in the graphic.

The Graphic

While the various graphic examples are discussed with reference to appliqués, it is to be understood that the teachings of this disclosure apply to other types of graphics, such as stickers, sew-on patches, and the like.

Figure 1A:
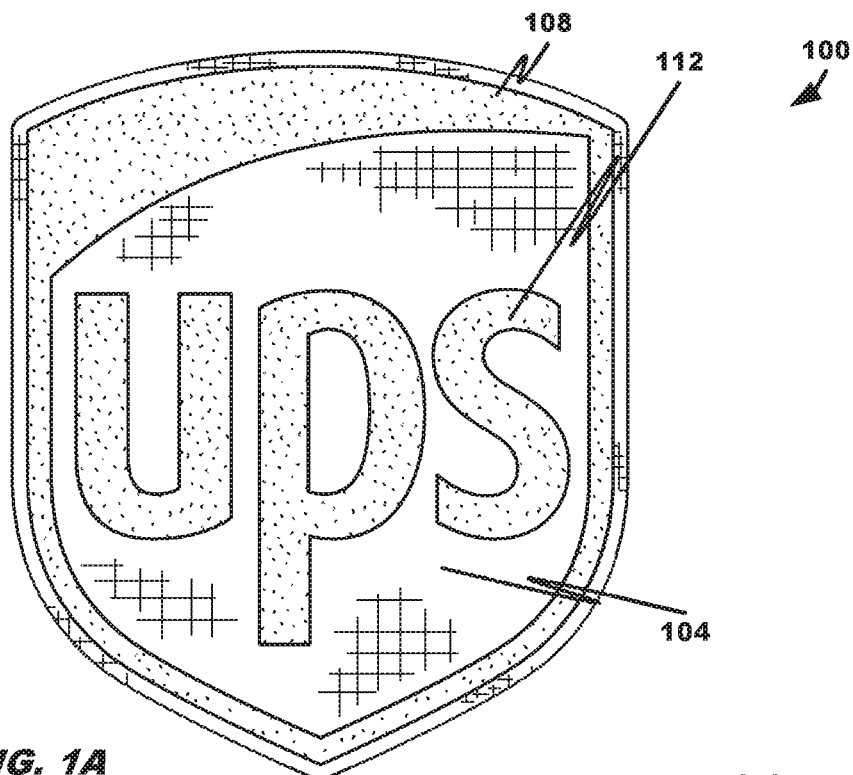
FIG. 1A is a plan view of an appliqué according to an embodiment of this disclosure.
Figure 1B:
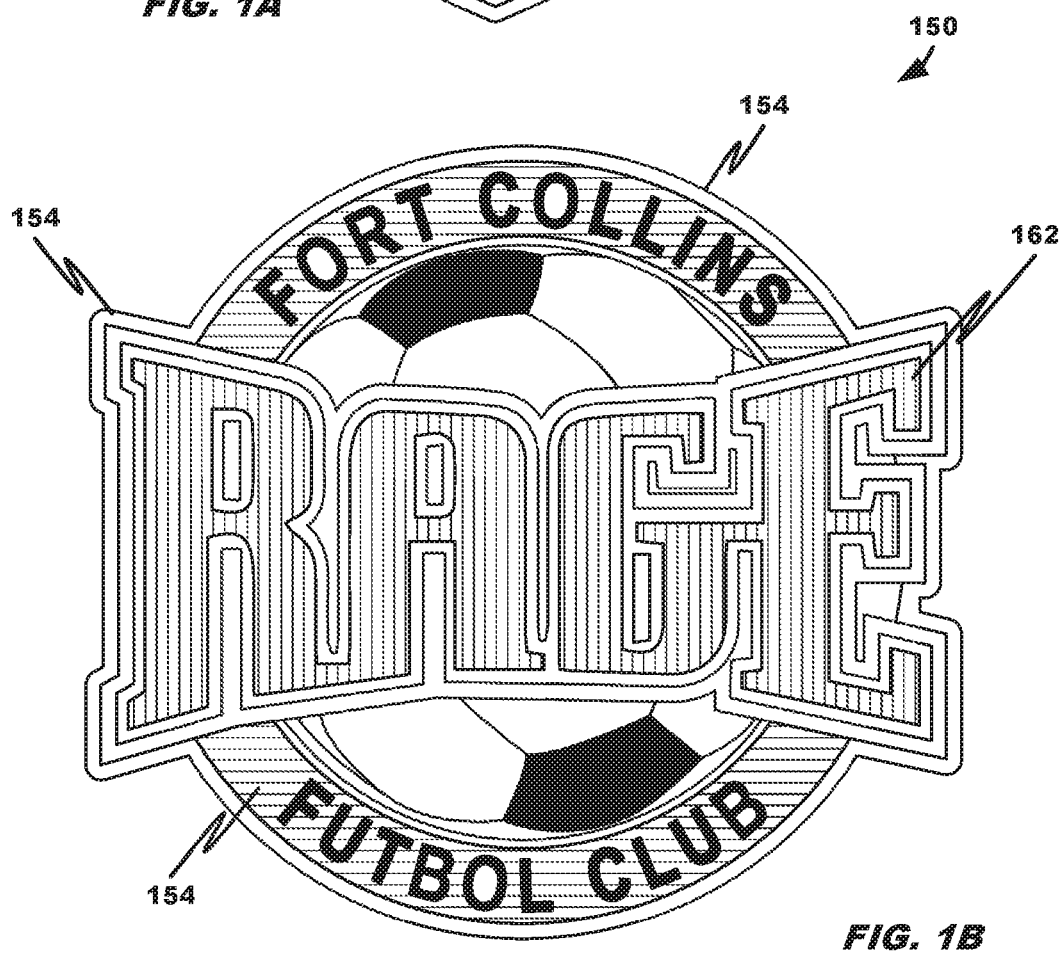
FIG. 1B is a plan view of an appliqué according to an embodiment of this disclosure.

With reference to FIGS. 1A and 1B, exemplary appliqués according to some embodiments of the present disclosure are depicted. FIG. 1A depicts a first appliqué 100 comprising a mono- or uni-colored non-retroreflective and textured woven or knit textile 104 as background for a differently colored retroreflective border 108 and corporate logo "UPS" 112. FIG. 1B depicts a second appliqué 150 comprising a multi-colored non-retroreflective and textured woven or knit textile 154 as background for a differently colored sports logo "RAGE" 162. The background non-retroreflective and textured woven or knit textile 104 and 154 can be dyed or printed (as in the case of appliqué 150) depending on the application. The retroreflective border 108 and logos 112 and 162 can be any retroreflective structure as discussed in detail below.

The textile 104 and 154 has a lower degree of retroreflectivity than the retroreflective material in the retroreflective border 108 and logos 112 and 162 creating visual contrast. While it can be difficult to place a specific numerical limitation on the required relative efficiency because of possible variations in size, shape, and definition of the image areas, the retroreflective border 108 and logos 112 and 162 are typically at least about 20% brighter, more typically at least about 30% brighter, more typically at least about 40% brighter, more typically at least about 50% brighter, more typically at least about 60% brighter, more typically at least about 70% brighter, more typically at least about 80% brighter, more typically at least about 90% brighter, more typically at least about 100% brighter, more typically at least about 110% brighter, more typically at least about 120% brighter, more typically at least about 130% brighter, more typically at least about 140% brighter, more typically at least about 150% brighter, more typically at least about 160% brighter, more typically at least about 170% brighter, more typically at least about 180% brighter, more typically at least about 190% brighter, and more typically at least about 200% brighter, or more efficient as a retroreflector when compared to the non-retroreflective and textured woven or knit textile 104 and 154. In some embodiments, the retroreflective border 108 and logos 112 and 162 act as a retroreflector and have a lower diffuse reflectance of incident light but higher specular reflectance (with less scattering) of incident light compared to the non-retroreflective and textured woven or knit textile 104 and 154. In at least some embodiments, the retroreflective border 108 and logos 112 and 162 exhibits a total light return that is typically not less than about 5%, more typically not less than about 8%, more typically not less than about 10%, more typically not less than about 12%, more typically not less than about 15%, more typically not less than about 17.5%, more typically not less than about 20%, more typically not less than about 25%, more typically not less about 30%, for incident visible light at an entrance angle of −4 degrees. In contrast, the non-retroreflective and textured woven or knit textile 104 and 154 exhibit, in some embodiments, a total light return that is typically less than 5%, more typically no more than about 4%, more typically no more than about 3%, and more typically no more than about 2.5% for incident visible light at an entrance angle of −4 degrees. Stated differently, for incident visible light at an entrance angle of −4 degrees, a total light return of the first surface of the retroreflective material is typically at least about 25% greater, more typically at least about 50% greater, more typically at least about 75% greater, more typically at least about 100% greater, more typically at least about 150% greater, more typically at least about 175% greater, and more typically at least about 200% greater than a total light return of the first textile surface. In at least some of the embodiments, the retroreflective border 108 and logos 112 and 162 exhibit a coefficient of retroreflection $R_A$ that is typically not less than about 40 cd/(lux·m$^2$), more typically not less than about 50 cd/(lux·m$^2$), more typically not less than about 60 cd/(lux·m$^2$), more typically not less than about 70 cd/(lux·m$^2$), more typically not less than about 80 cd/(lux·m$^2$), more typically not less than about 90 cd/(lux·m$^2$), more typically not less than about 100 cd/(lux·m$^2$), more typically not less than about 125 cd/(lux·m$^2$), more typically not less than about 150 cd/(lux·m$^2$), more typically not less than about 175 cd/(lux·m$^2$), and more typically not less than about 200 cd/(lux·m$^2$) for an observation angle of 0.2 degrees and an entrance angle of −4 degrees. In contrast, the non-retroreflective and textured woven or knit textile 104 and 154 exhibits, in some embodiments, a coefficient of retroreflection $R_A$ that is typically less than 40 cd/(lux·m$^2$), more typically no more than about 30 cd/(lux·m$^2$), more typically no more than about 20 cd/(lux·m$^2$), more typically no more than about 10 cd/(lux·m$^2$), and more typically no more than about 5 cd/(lux·m$^2$). The $R_A$ of the exposed surface of the textile material is typically no more than about 75%, more typically no more than about 50%, more typically no more than about 25%, more typically no more than about 25%, and more typically no more than about 10% of the $R_A$ of the viewable (upper) surface of the retroreflective material.

While not wishing to be bound by any theory, it is believed that the combination of a retroreflective material with a non-retroreflective and textured woven or knit textile can provide a highly attractive and faithfully reproduced authentic logo and colors graphic under ambient daylight conditions and a much more reflective material as perceived by a viewer, in low-light conditions, such as at night time also authentically reproducing original logo. This can be particularly the case when the retroreflective material is offset from (e.g., positioned on top of) the non-retroreflective and textured woven or knit textile. The higher perceived reflectance can more effectively alert others, particularly vehicle operators, of the presence of the person wearing the graphic thereby providing higher levels of pedestrian and worker safety and/or to attract attention (promotionally for example) or to add fashion value (high-tech look).

Figure 2:
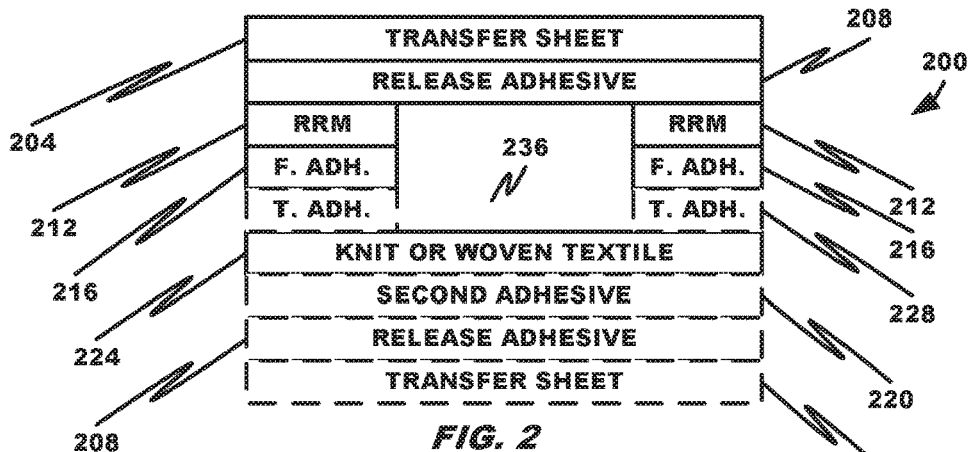
FIG. 2 is a cross-sectional view along line A-A of FIG. 4 of a textile according to an embodiment of this disclosure.
Figure 4:
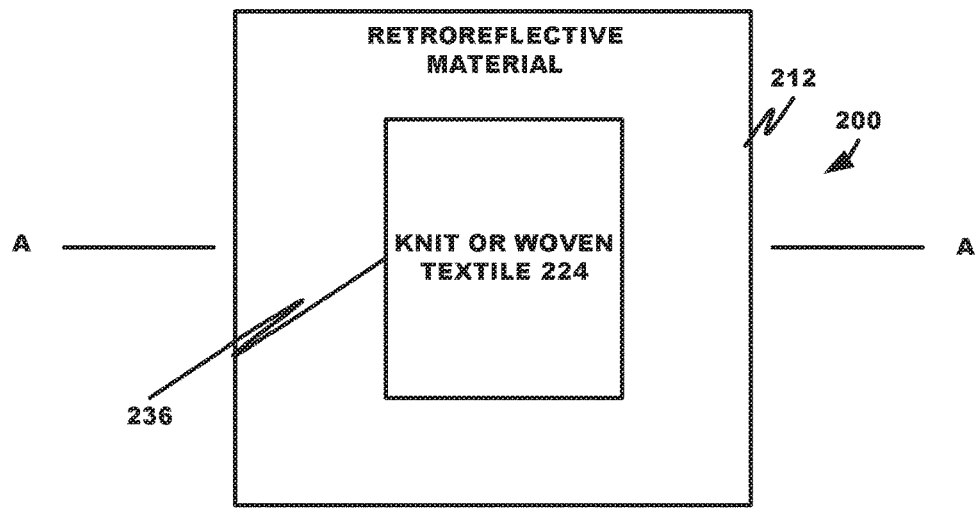
FIG. 4 is a plan view of the textile of FIG. 2 or FIG. 5.

With reference to FIGS. 2 and 4, an appliqué 200 according to an embodiment of the disclosure is depicted.

The appliqué 200 comprises (from top to bottom) a transfer sheet 204, release adhesive 208, retroreflective material ("RRM") 212, first adhesive ("F. ADH.") 216, optional second adhesive ("S. ADH.") 220, knit or woven textile 224, and optional third adhesive (T. ADH.") 228. As can be seen from FIG. 4, the knit or woven textile is visible through a window 236 (or area free of retroreflective material). As can be seen from FIG. 2, the plane of the upper and lower surface of the knit or woven textile 224 is substantially parallel to, but not coplanar with, the plane of the upper or lower surface of the retroreflective material 212. The knit or woven textile 224 can provide an acceptable surface for the first (or third) adhesive 216 or 228, which can penetrate and form a mechanical grip on the textile upper surface. This is so because the textile material provides a substantially flat surface for adhesion, due in part to the orientations of the interlocked threads and yarns (e.g., the mean path) substantially along and in a plane that is substantially parallel to the planes of the upper surfaces of the retroreflective and textile materials. The configuration of FIG. 2 is advantageous for knit textiles, which offer some surface texturing and an ability to conform and are lightweight. These properties are typically not possible with woven textiles.

Figure 3:
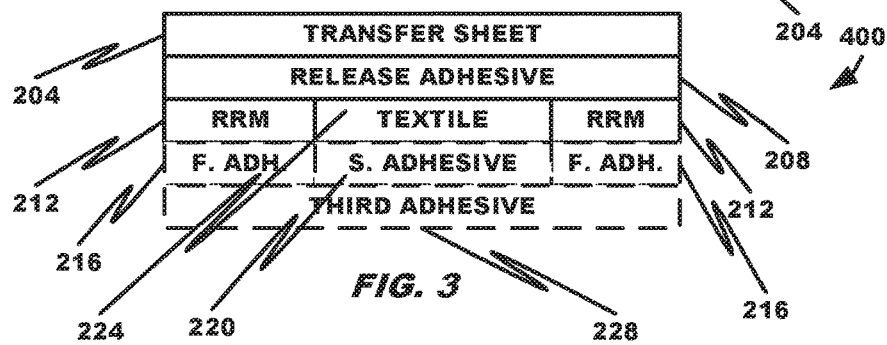
FIG. 3 is a cross-sectional view along line A-A of FIG. 4 of a textile according to an embodiment of this disclosure.
Figure 5:
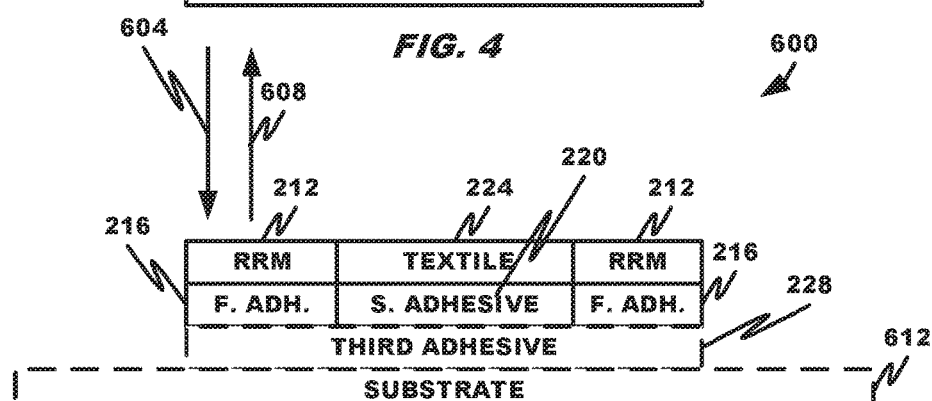
FIG. 5 is a cross-sectional view of the textile of FIG. 4 applied to a substrate according to an embodiment of this disclosure.

With reference to FIGS. 3 and 5, appliqués 400 and 600 according to an embodiment of the disclosure are depicted.

The appliqué 400 comprises (from top to bottom) a transfer sheet 204, release adhesive 208, retroreflective material ("R.M.") 212, first adhesive ("F. Adhesive") 216, second adhesive 220, knit or woven textile 224, and optional third adhesive 228 while the appliqué 600 depicts the appliqué 400 after it has been permanently adhered to a substrate 612, such as an article of clothing, typically by the application of heat and pressure. Following application to the substrate 612, the transfer sheet 204 and release adhesive 208 have been removed from the appliqué. The retroreflectance of the retroreflective material is shown by the arrow 604 depicting incident or incoming light and the arrow 608 depicting reflected light back towards the light source. As can be seen from FIGS. 3 and 5, the planes of the upper and lower surface of the knit or woven textile 224 is substantially parallel to and coplanar with the plane of the upper or lower surface of the retroreflective material 212, respectively. Compared to the appliqué 200, the appliqués 400 and 600 position the knit or woven textile in the window 236 defined by the retroreflective material and the plane of the upper surface of the knit or woven textile is substantially coplanar with the plane of the upper surface of the retroreflective material.

The first and second adhesives can be omitted in lieu of the third adhesive in certain applications.

Figure 6:
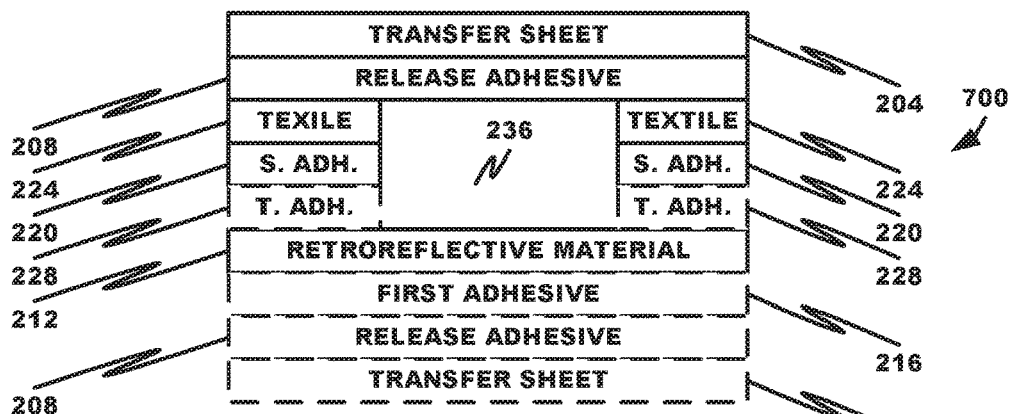
FIG. 6 is a cross-sectional view along line A-A of FIG. 8 of a textile according to an embodiment of this disclosure.
Figure 7:
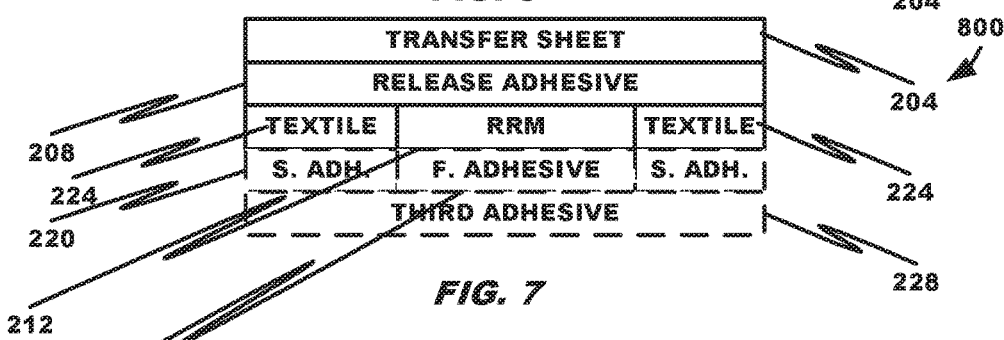
FIG. 7 is a cross-sectional view along line A-A of FIG. 8 of a textile according to an embodiment of this disclosure.
Figure 8:
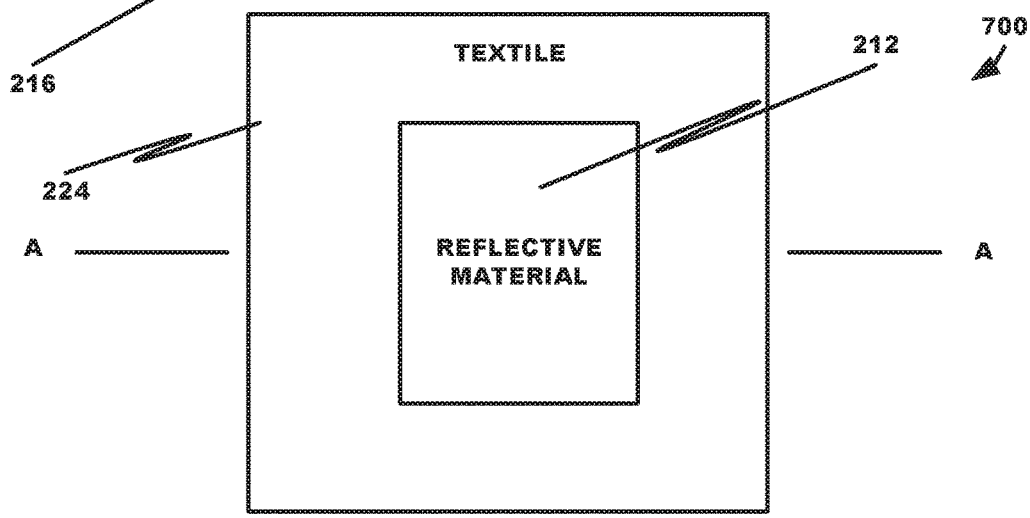
FIG. 8 is a plan view of the textile of FIG. 6 or FIG. 9.
Figure 9:
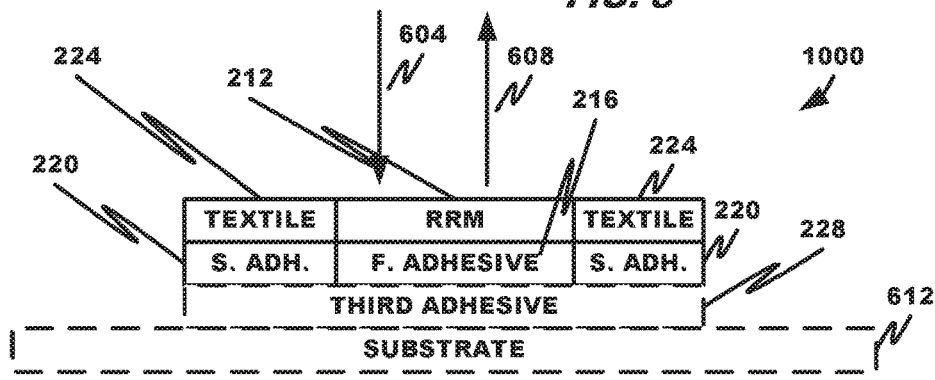
FIG. 9 is a cross-sectional view of the textile of FIG. 6 applied to a substrate according to an embodiment of this disclosure.

As shown in FIGS. 6-9, the positions of the retroreflective material 212 and knit or woven textiles 224 in the appliqués 200, 400 and 600 can be exchanged or reversed depending on the application. FIGS. 6 and 8 depict an appliqué 700 in which the positions of the retroreflective material 212 and knit or woven textiles 224 are reversed compared to appliqué 200. Likewise, FIGS. 7 and 9 depict appliqués 800 and 1000 in which the positions of the retroreflective material 212 and knit or woven textiles 224 are reversed compared to appliqués 400 and 600, respectively.

The Textile Material

In the various appliqués above, the textile material 224 can be any knit or woven fabric or non-woven (felt) fabric.
The Knit Textile Material The knit textile can be formed by any knitting process, including but not limited to weft knitting (in which the wales are substantially perpendicular to the course of the yarn), warp knitting (in which the wales and courses are roughly parallel to each other), knit stitch, purl stitch, stockinette, reverse stockinette, garter stitch, seed stitch, right-plaited stitches, left-plaited stitches, flat knitting, circular knitting, a single yarn knit, a plurality of yarns knit, a double knit textile, an uneven knit, a shadow knit, a fair-isle knit, a plaited knit, flat knitting, circular knitting, or felt knitting. Examples of possible knit patterns or constructions include knits and purls, reversible stitch patterns, eyelets and lace, mosaic stitch patterns, multi-color stitch patterns, and the like. Specific examples of patterns include basketweave, basketweave II, box stitch, broken rib, cable stitch, casting on, casting off, checks and ridges, chevron, close checks, decrease, diagonal rib, diagonals, diamond pattern, double basket weave, double seed stitch, elongated chevron, embossed diamonds, embossed moss rib, garter rib, garter stitch, garter stitch steps, increase, Inverness diamonds, King Charles brocade, knit stitch, large diamonds, little pyramids, mistake rib, mock cable, moss diamonds, moss panels, moss stitch, moss stitch border diamonds, moss stitch parallelograms, parallelograms, parallelograms II, pavilion, pique triangles, plain diamonds, purl stitch, purled ladder, rib stitch, rice stitch, seed stitch, single chevron, slip stitch, spaced checks, squares, squares in squares, stocking stitch, thermal underwear stitch, triangles, triangle ribs, triangle squares, triangles, twin rib, two by two rib, windmill, woven stitch, yarn over, and combinations thereof. A typical appliqué media has knit and purl stitches arranged substantially symmetrically (such as in ribbing, garter stitch, or seed stitch) so that the appliqué media lies flat.

While a number of knit patterns are set forth, it is important to understand that they are set forth as examples only and not by way of limitation. Any possible knit pattern or knitting method may be used. The differing weave patterns are described in U.S. Pat. Nos. 9,180,729 and 8,475,905, which is incorporated herein by this reference. In one configuration, the knit is a warp knit. In one configuration, the knit is a circular knit. In many applications (such as in sportswear), a circular knit is more elastic and deformation recoverable than a warp knit.

The appliqué media can have ornaments added to the knitting, such as bobbles, sequins, and beads. Long loops can also be drawn out and secured, such as in loop knitting.

Additional patterns can be made on the surface of the knit fabric using embroidery. Ornamental pieces may be knit separately and attached as appliqués.
The Woven Textile Material The textile material may be any woven textile. As used herein the term "woven textile" refers to a textile made or constructed by interlacing one or more textile materials, such as, but not limited to, threads, yarns or strips of the one or more textile materials. The woven textile is typically formed by interlacing the textile material in warp and weft directions. Woven textiles typically stretch in a bias direction, that is, between the warp and weft directions. However, if any of the one or more textile materials have elastic or elastomeric properties the woven textile may stretch in directions other than the bias. Furthermore, the woven textile may include a "filling" yarn or thread that may be inserted into the weave. The filling yarn or thread is neither a warp nor a weft direction. Typically, the filling yarn or thread adds a dimensional or textured character or image to the woven fabric.

While a number of weave patterns are set forth, it is important to understand that they are set forth as examples only and not by way of limitation. Any possible weave pattern or weave method may be used. Differing weave patterns are described in U.S. Pat. No. 9,180,728, which is incorporated herein by this reference.
The Non-Woven Material The non-woven material can be any non-woven material, with single- or multi-colored flock being typical. Because the material is not woven or knit and is perpendicular to the plane of the exposed surface of the retroreflective material, the stability of the retroreflective material can be compromised. To overcome this problem, the non-woven material typically has a fiber length of less than about 0.75 mm, more typically no more than about 0.5 mm, and more typically ranges from about 0.15 mm to about 0.30 mm.

The textile material may be combinations of knit textiles having different knit patterns, of woven textiles having different weave patterns, of woven and knit textiles, of woven and non-woven materials, or of knit and non-woven materials. For example, the mixed textile materials can be polyester textiles having one or more differing knit patterns (and/or pattern elements or parameters), yarn weights (tex), wraps per inch, stitch or loop densities, lofts, hands, surface patterns, surface textures, tensions, and/or yarn types and/or compositions (e.g., using yarns of differing light reflectivities, refractances, or reflectances such as a combination of dull (or diffused light) fibers to bright, lustrous, or shiny (or high gloss or highly light reflective or specular (mirror like)) fibers).

The textile, whether knit, non-woven, or woven, can be sublimation printed, such as by sublimation dye heat transfer printing, to provide a mixed appliqué media creating the impression of a multi-dimensional image. For example, the textiles can be polyester textiles having one or more differing knit patterns (and/or pattern elements or parameters), knit constructions (or textures), weave patterns (and/or pattern elements or parameters), weave constructions, yarn weights (tex), wraps per inch, stitch or loop densities, lofts, hands, surface patterns, surface textures, tensions, yarn types and/or compositions (e.g., using yarns of differing light reflectivities, refractances, or reflectances such as a combination of dull (or diffused light) fibers to bright, lustrous, or shiny (or high gloss or highly light reflective or specular (mirror like)), and/or yarn distribution. The fibers are typically initially white, later sublimation printed with the printed design being in register with the different textiles and their respective design elements, and cut into different pieces corresponding to design elements. The various design elements or pieces can be laminated together to form the multi-dimensional (e.g., heat applied) applique. The appliqué media can, individually and/or collectively, have a heat seal backing.

The graphic can comprise a multi-colored printed design. The printing is typically applied by sublimation printing techniques, before or after the textile is adhered to one or more of the first adhesive film, elastomeric film, and/or second adhesive film. In one configuration, it is applied by sublimation printing techniques during lamination of one or more of the first adhesive film, elastomeric film, second adhesive film, and/or substrate to the appliqué media.

The textile pieces can be sublimation printed separately or after they are heat sealed together. In the former configuration, the textile pieces may be printed before or after they are cut out into their respective final shapes to be incorporated into the appliqué. Each of the textile pieces can have a portion of the final printed design.

The Retroreflective Material

The retroreflective material can be any material or structure having retroreflective properties, with examples comprising a glass bead and metal type retroreflective media, such as 3M™ Scotchlite™. The retroreflective material acts as a retroreflector and reflects light back towards its source as shown by the arrows of FIGS. 5 and 9).

Figure 13:
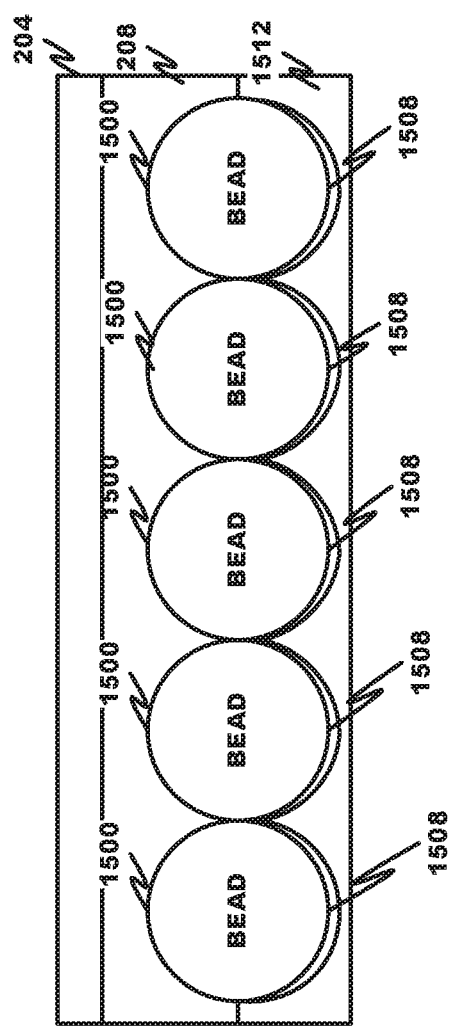
FIG. 13 is a cross-sectional view of a retroreflective structure according to the prior art.
Figure 14:
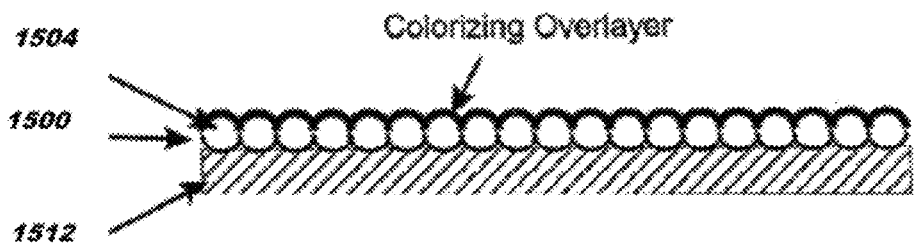
FIG. 14 is a cross-sectional view of a retroreflective structure according to the prior art.

The glass beads use one or more of specular reflection, refraction, and total internal reflection to accomplish this result. With reference to FIG. 13, the glass beads 1500 can have a rear surface 1504 coated with a reflective (typically metallized) layer 1508 so that it acts as a mirror to direct refracted light towards the viewer. While the glass beads are shown as being spherical, the glass beads can have any shape, whether spherical, triangular or square pyramidal, cubic, toric, cylindrical, conical, cuboidal, and the like. The beads can have a mean, median, and average diameter from about 15 to about 85 microns. The effective refractive index for the glass beads typically varies from about 1.5 to about 3, with a refractive index of in the range of about 1.75 to about 2.5 being common. The retroreflective material typically comprises a transfer sheet 204 and release adhesive 208 on a front facing surface of the beads and an adhesive 1512 on a rear facing surface of the bead. While the beads have retroreflective properties, the adhesive can be any adhesive formulation, including those discussed below in connection with the first, second, and third adhesives 216, 220, and 228. The retroreflective material can include a water repellant or resistant optically transparent face film (such as a polymeric film) substantially encompassing the beads. In one configuration, the face film covers a front surface of the beads and the first adhesive contacts covers a rear surface of the beads. In metallized micro-prismatic retroreflective materials, the rear surface of the beads is coated with a metalized layer (e.g., aluminum, silver, or nickel) to increase light reflectance and decrease optical losses. The thickness of the metallized layer is typically no more than about 1 micron and more typically no more than about 0.1 micron. With reference to FIG. 14, the beads 1500 can have a substantially transparent colorizing overlayer 1504 to cause the reflected light to have a selected wavelength distribution or color to the viewer. In encapsulated microprismatic retroreflective materials, a rear surface of the beads is in a sealed air-filled cell. The cell is sealed by a cushion coat which is spaced from (and does not coat) the rear surfaces of the beads along the upper surface of the cell but coats the other lower and side surfaces of the cell. Typically, the cushion coat is formed from a layer of white pigmented binder containing a polyvinyl copolymer, a thermoplastic polyurethane, and an aminoplast resin as disclosed in U.S. Pat. No. 6,586,067, which is incorporated herein by this reference. The first adhesive 216 is in contact with the opposing surface of the cushion coat. The first adhesive can be in contact with an optional third adhesive 228 depending on the application.

Figure 15:
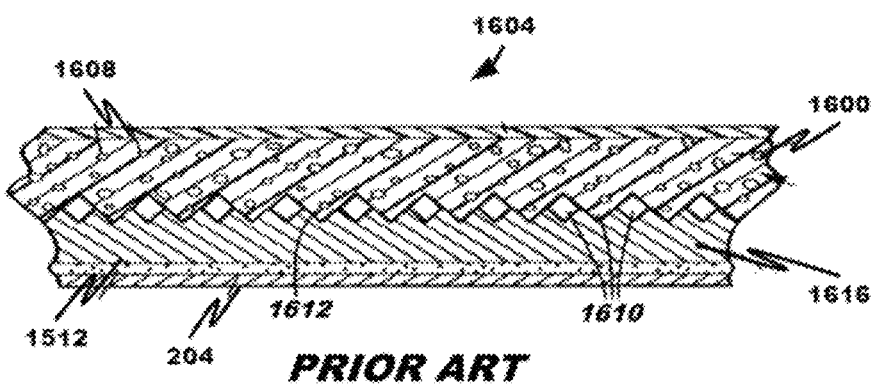
FIG. 15 is a cross-sectional view of a retroreflective structure according to the prior art.
Figure 16:
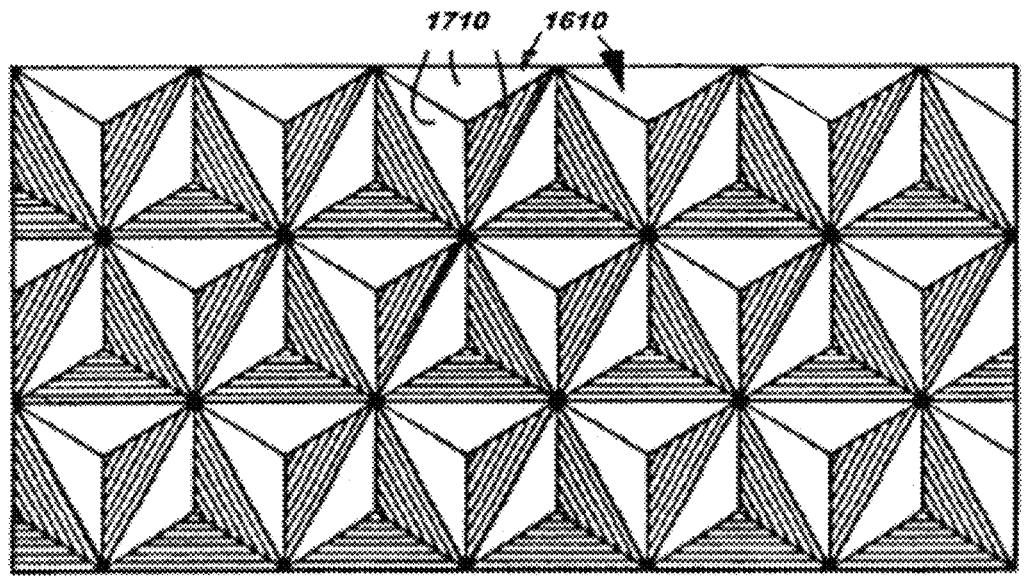
FIG. 16 is a plan view of a retroreflective structure according to the prior art.

In another configuration, an electroluminescent sheeting uses a transparent or translucent microprismatic over sheeting to produce light emission, or retroreflectivity. An example of this configuration is shown in FIGS. 15-16. A cube-corner sheeting 1600 has a front-facing retroreflective region 1604. An overlay film 1608 can be provided to protect the cube-corner sheeting from ultra-violet rays and abrasion. To promote retroreflectivity, the back side of cube-corner elements 1610 has three planar faces 1710 and can interface with a reflective material (for example metal) or a material that has a significantly different refractive index from the polymeric material of the cube-corner elements (for example, air). A metallic coating 1612 can be placed on the back side of polymeric cube-corner elements by vapor-depositing or chemically depositing a metal such as aluminum, silver, or nickel. As shown, a backing material 1616 can be placed in contact with the metallic coating 1612, and an adhesive layer 1512 can be applied to the backing 1616, or alternatively, the adhesive layer 1512 can be applied directly to the metallic coating 1612. A release paper 204 can be provided to cover the adhesive 1616 until the retroreflective material is adhered to the textile material. The retroreflective article may be colored by incorporating a dye or a transparent pigment in the front portion of the sheeting. The dye or transparent pigment may be placed, for example, in the body portion, the cube-corner elements, an overlay film, or a combination thereof. The retroreflective article also can be colored by applying an ink containing a dye or transparent pigment onto either side of an overlay film.

The coefficient of retroreflection RA, or retroreflectivity, can be modified depending on the properties desired in an application. Typically, the retroreflective material complies with one or more of AS/NZS 1906.4, 4602.1, 4967, 4824, and 4602.2 specifications. In some embodiments, RA meets the ASTM D4956-07e1 standards at 0 degree and 90 degree orientation angles. In some embodiments, RA is in a range from about 5 cd/(lux·m$^2$) to about 1,500 cd/(lux·m$^2$) when measured at 0.2 degree observation angle and +5 degree entrance angle according to ASTM E-810 test method or CIE 54.2; 2001 test method. In some embodiments, $R_A$ is at least about 330 cd/(lux·m$^2$), or at least about 500 cd/(lux·m$^2$), or at least about 700 cd/(lux·m$^2$) as measured according to ASTM E-810 test method or CIE 54.2; 2001 test method at 0.2 degree observation angle and +5 degree entrance angle. In some embodiments, $R_A$ is at least about 60 cd/(lux·m$^2$), or at least about 80 cd/(lux·m$^2$), or at least about 100 cd/(lux·m$^2$) as measured according to ASTM E-810 test method or CIE 54.2; 2001 test method at 0.2 degree observation angle and +5 degree entrance angle.

The retroreflective material is further described in U.S. Pat. Nos. 3,420,597; 3,801,183; 5,272,562; 8,470,394; 9,248,470; and 8,288,940 and U.S. patent applications 1506/0051559; 2018/0117863; and 2018/0180779; and PCT WO 2018/217519, each of which is incorporated fully herein by this reference.

The above examples are not intended to be limiting, and it is to be understood that any retroreflective material can be used.

The First, Second, and Third Adhesive Films 216, 220, and 228

The first, second, and third adhesives can be thermoplastic (e.g., hot melt) or thermoset adhesives and have the same or different compositions. In one configuration, the first, second, third, and fourth adhesives are hot melt adhesives. The properties of the first, second, and third adhesives 216, 220, and 228 depend on the application.

The first, second, and third adhesives 216, 220, and 228 commonly have viscosities to form substantially continuous layers. The first, second, and third adhesives 216, 220, and 228 are typically a substantially continuously distributed cast, blown, or extruded film and may be thermoset, co-extruded and/or noncompatible.

In a typical embodiment, each of the first, second, and third adhesives 216, 220, and 228 comprises one of a thermosetting, a thermoplastic or combination thereof adhesive. Typically, the first, second, and third adhesives 216, 220, and 228 comprise thermoplastic adhesives. Thermoplastic means the material will repeatedly soften when heated and hardened with cooled. Thermosetting means the material will undergo or has undergone a thermosetting chemical reaction by the action of heat, catalyst, ultraviolet energy or such. The thermosetting chemical reaction forms a relatively infusible state. The first, second, and third adhesives 216, 220, and 228 may be the same or differ in one or more chemical and/or physical properties. Typically, the first, second, and third adhesives 216, 220, and 228 have substantially the same chemical and/or physical properties. A chemical property means any chemical reactivity property associated with the first, second, and third adhesives 216, 220, and 228. A physical property means any property not associated with a chemical change in the substance and/or one or more substances associated with the first, second, and third adhesives 216, 220, and 228. Non-limiting examples of physical properties are: absorption, concentration, density, dielectric, ductility, fluidity, fluid flow, malleability, melt and/or softening point, permeability, solubility, specific heat, viscosity, shear, stress, recovery, elasticity, and melt flow index. Non-limiting examples of chemical properties are: composition, bond structure, chemical stability. More typically, the first, second, and third adhesives 216, 220, and 228 substantially comprise substantially the same thermoplastic adhesive compositions.

Suitable thermoplastic adhesive compositions comprise homopolymers, copolymers or polymer alloy comprising one or more of polyolefins, polystyrenes, polyvinyls, polyacrylics, polyhalo-olefins, polydienes, polyoxides, polyesthers, polyacetals, polysulfides, polythioesters, polyamides, polythioamides, polyurethanes, polythiourethanes, polyureas, polythioureas, polyimides, polythioimides, polyanhydrides, polythianhydrides, polycarbonates, polythiocarbonates, polyimines, polysiloxanes, polysilanes, polyphosphazenes, polyketones, polythioketones, polysulfones, polysulfoxides, polysulfonates, polysulfoamides, polyphylenes, and combinations and/or mixtures thereof. More specifically in a typical embodiment, the thermoplastic adhesive composition comprises one of acrylonitrile butadiene styrene, acrylic (PMMA), celluloid, cellulose acetate, cyclo-olefin copolymer, ethylene-vinyl acetate (EVA), ethylene vinyl alcohol (EVOH), fluoroplastic (PTFE, FEP, PFA, CTFE, ECTFE, and/or ETFE), ionomer, liquid crystal polymer (LCP), polyacetal (POM and/or acetal), polyacrylate (acrylic), polyacrylonitrile (PAN or acrylonitrile), polyamide (PA or nylon), polyamide-imide (PAI), polyaryletherketone (PAEK and/or ketone), polybutadiene (PBD), polybutylene (PB), polybutylene terphthalate (PBT), polycaprolactone (PCL), polychlorotrifluoroethylene (PCTFE), polyethylene terephthalate (PET), polycycloheylene dimethylene terephthalate (PCT), polycarbonate (PC), polyhydroxylalkanoate (PHA), polyketone (PK), polyester, polyethylene(PE), polyetherketoneketone (PEKK), polyetherimide (PEI), polyethersulfone (PES), polysulfone, polyethlenechloriate (PEC), polyimide, polyacetic acid (PLA), polymethylpentene (PMP), polyphenylene oxide (PPO), polyphylene sulfide (PPS), polyphthalamide (PPA), polypropylen (PP), polystyrene (PS), polsulfone (PSU), polytrimethylen terphthalate (PTT), polyurethane (PU), polyvinyl acetate (PVA), polyvinyl chloride (PVC), polyvinylidene chloride (PVDC), styrene-acrylonitrile (SAN), and combinations thereof. In an even more typical embodiment, the thermoplastic adhesive comprising the first 106 and second 108 adhesive films comprise one or more of polyurethane, polyvinyl acetate, polyamide, polyacrylate and combinations thereof. In a more typical embodiment, the thermoplastic adhesive comprising the first 216, second 220, and third 228 adhesive films comprise polyurethanes or polyesters.

The first, second, and third adhesives 216, 220, and 228 have one or more of melt flow index and softening point. The softening point refers to the temperature at which the adhesive becomes one or more of tacky, soft to the touch and/or pliable at a pressure of from about 1 psi to about 100 psi, typically at a pressure from about 5 psi to about 50 psi, more typically, at a pressure from about 10 psi to about 40 psi. Typically, the softening point of one or both of the first 106 and second 108 adhesive films ranges from about 50 degrees Celsius to about 185 degrees Celsius, more typically from about 50 degrees Celsius to about 140 degrees Celsius, more typically from about 60 degrees Celsius to about 100 degrees Celsius, and even more typically from about 75 degrees Celsius to about 85 degrees Celsius. The melt flow index is measured at 175° C. under a 2.16 kg mass. The melt flow index for first and second adhesive films typically ranges from about 5 dg/min to about 100 dg/min, more typically from about 5 dg/min to about 75 dg/min, more typically from about 10 to about 60 dg/min, and even more typically from about 35 to about 50 dg/min.

The first, second, and third adhesives 216, 220, and 228 are typically substantially continuously distributed over an areal extent of the substantially continuously distributed adjoining layer(s). Furthermore, the first adhesive 216 is typically substantially continuously distributed over an areal extent of an interface between the first adhesive 216 and the retroreflective material 212, the second adhesive 220 over an areal extent of an interface between the second adhesive and the knit or woven textile 224, and the third adhesive 228 over an areal extent between the third adhesive and both adjoining materials. The first, second, and third adhesives 216, 220, and 228 are typically substantially free of holes and/or voids over their areal extents.

When the retroreflective material is positioned below the textile material, the first adhesive should be selected to have an equal or stronger force of adhesion to the retroreflective elements (e.g., beads) when compared to the force of adhesion of the second adhesive to the retroreflective elements.

When the retroreflective material is positioned above the textile material, the first adhesive should be selected to have an equal or stronger force of adhesion to the textile material when compared to the force of adhesion of the second adhesive to the textile material.

The Release Adhesive 208

The release adhesive 208 is selected such that the bonding force between the release adhesive 208 and the adjoining material is less than the bonding force between the first, second, or third adhesive with their respective adjoining materials. The release adhesive 208 may be any adhesive that adheres more strongly to the transfer sheet 204 than the appliqué but adheres to both enough to hold them together. For example, the release adhesive 208 may be any temporary adhesive, such as a resin or a copolymer, e.g., a polyvinyl acetate, polyvinyl alcohol, polyvinyl chloride, polyvinyl butyral, acrylic resin, polyurethane, polyester, polyamides, cellulose derivatives, rubber derivatives, starch, casein, dextrin, gum arabic, carboxymethyl cellulose, rosin, silicone, or compositions containing two or more of these ingredients. Typically, the release adhesive 208 is a water-based adhesive, that is the release adhesive 208 is one or more of dispersed, dissolved, suspended or emulsified within water.

The Transfer Sheet 204

The transfer sheet 204 may be any material that is relatively dimensionally stable under the conditions of temperature and pressure encountered during any of the processing conditions presented herein. Typically, but not always, the transfer sheet 204 is a discontinuous as opposed to a continuous sheet on a running web line. The transfer sheet 204 may be any low-cost, dimensionally stable article to be decorated, such as paper, plastic film, and the like, typically in the form of a discontinuous sheet or a running web line material.

The Substrate 612

The substrate 612 to which the applique is adhered may comprise any material. Non-limiting examples of suitable article to be decorated materials comprise metallic materials, synthetic or natural polymeric materials, ceramic materials, leather-based materials and combinations thereof. In a common embodiment, the article to be decorated comprises an item of apparel. Non-limiting examples of items of apparel are uniforms, jerseys, pants, shirts, blouses, leggings, socks, shoes, under garments, headwear, and other accessories.

The substrate may have a single surface or a plurality of surfaces. Non-limiting examples of a single-surfaced substrate to be decorated are articles having one of a generally spherical, circular-donut, and elliptical-donut shapes. Non-limiting examples of substrate shapes having a plurality of article surfaces are articles substantially resembling one of a cube, rectangular-box and tetrahedral shapes.

Methods of Applique Manufacture

Figure 10:
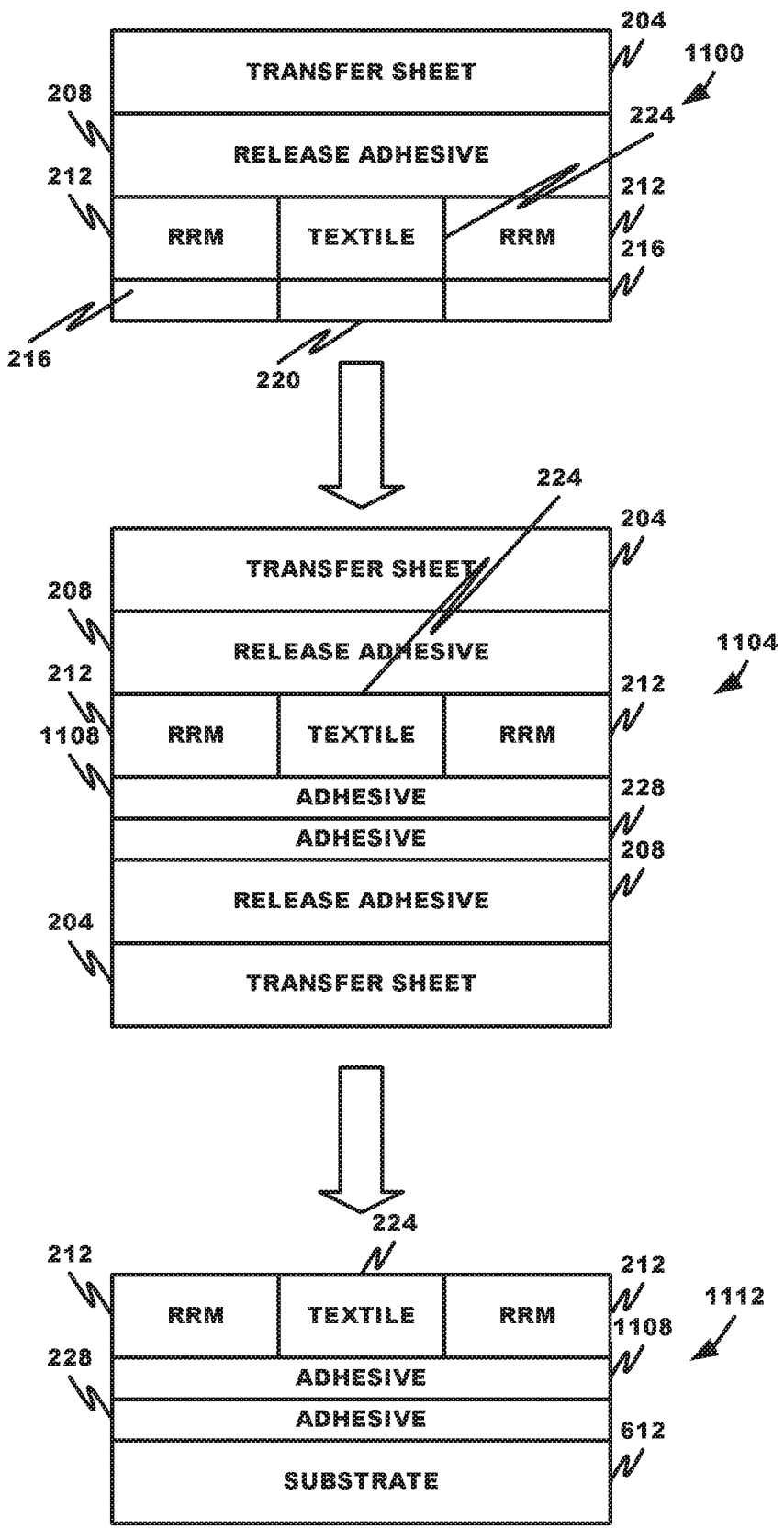
FIG. 10 depicts various intermediate and final appliqué structures according to an embodiment of this disclosure.

With reference to FIG. 10, an embodiment of a method of manufacturing graphics such as the appliqués 400 and 600 is shown.

In a first step, the textile and second adhesive 220 and retroreflective material 212 and first adhesive 216 are cut into desired patterns that, when combined in registration with each other, yield the desired overall design, the undesired portions of each being removed, and the retroreflective material and first adhesive positioned in the weeded portion of the textile 224 to form a first intermediate product 1100. The retroreflective material 212 commonly is provided in a roll or sheet that is readily cut into a final design shape. As noted previously, the retroreflective material can be imprinted with colored ink onto its surface to provide a variety of different colors.

Cutting may be done by any suitable technique. In one configuration, the textile and retroreflective material are cut in registration with the overall graphic design image. The cutting process may be any suitable cutting device known to a person of ordinary skill within the art, such as a steel-rule dies, hard tool metal dies, laser cutter, ultrasound cutter, high frequency cutter, hot-wire cutter, or water jet cutter. Typically, the cutting process is one of laser or die cutting process.

Laser cutting is typically used in applications where discoloration is not an issue. While laser cutting can seal and/or fuse the edges, extending the useful area of the textile to include the sealed and/or fused edges, it can also causing discoloration (e.g., yellowing) of the textile edge due to the condensation of the vaporized material from the cutting/fusing of the laser. In other words, the laser cutting can fuse the yarns or threads comprising the cut-edges of textile. The fused-edge yarns do not "pop-up" or fray, as do die-cut yarn edges. Die-cut edges typically have long loose yarns, such as "float" yarns on the surface which "pop up" and are easily and quickly frayed. While not wanting to be bound by any theory, one or more fused-edge yarns and the adhesive melt during the laser cutting to form the fused edge. Typically, the appearance of the cut fused-edge has a "beaded-like" appearance. It can be appreciated that, for some applications and designs frayed edges are typical, such as, designs that have a worn, more casual, and/or more vogue appearance. The fused-edge yarns stay-in place, are more durable and more highly valued by consumers and enable creation of most precise/authentic reproductions of official brand graphics (logos) with edges that do not include frayed appearance.

The laser power and speed and focus and adjustable distance from substrate during the cutting process commonly affect the degree that cut-edge yarns are fused. For example, low laser power and/or fast cutting speed decrease the degree to which the cut-edge is fused. Optimal fused-edges typically require a balancing of the laser power and line speed to properly fuse most, if not all, of the edge yarns and minimize, or eliminate, "pop-up" or frayed edge yarns.

While it is true that die-cut edges typically have long loose yarns, such as "float" yarns on the surface which "pop up" and are easily and quickly frayed, it has been surprisingly discovered that die-cutting the product of the present disclosure may not produce this result. The die-cut edge yarns stay-in place, are more durable and more highly valued by consumers. It can be appreciated that, for some applications and designs frayed edges are typical, such as, designs that have a worn, more casual, and/or more vogue appearance. The die cut-edges of the textile also allow higher processing line speeds. While not wishing to be bound by any theory, it appears that edge fibers are fused to some extent by being heated during heat sealing of the second or third adhesive to the textile and retroreflective materials and/or are held down by backing adhesive.

In one implementation, cutting is performed by a cutting machine having an optical element to identify a selected reference point in each design image, such as the final outermost edge of the design image (such as badge shape) so that the outside cutting is in register (aligned) to the overall image. The reference point or fiducial is in common during cutting of the various layers to guide the cutting device (such as an x-y plotter cutter or laser cutter) and may be identified optically, for example, using reflected laser light in a conventional laser light registration system, as known by those of skill in the art. Optical registration is typical over using a guide side of the cut out insert (or a prior cut line) because some materials lack sufficient dimensionality to use an edge for registration. Once the desired reference point is identified, the cutting element cuts out the design image using programmed logic to impart accurate registration and to precisely cut out the design image. In this manner, the design image is cut to the desired size and shape. Also, the design elements of the design image are registered relative to the cut lines. It can be appreciated that, one of the artistic design elements is the relationship of the cut lines with the design image.

Prior to being combined with the retroreflective material, the textile can be pre-printed (e.g., by screen printing, digital direct, dye sublimation (direct or transfer) or other method) to add fine design details and/or specified color matched elements to the overall design, for example, to maintain integrity of the original design to be reproduced. Any sublimation printing technique may be employed. Examples of sublimation printing techniques include a dye-sublimation (heat) transfer (in which a heat transfer image is placed on the appliqué media and the dye thermally transferred to the appliqué media), dye-sublimation printer, and the like. Sublimation printing commonly occurs at elevated temperature, such as higher than about 275° F. and even more typically higher than about 350° F., which is normally above the melting point of the first, second, and third adhesives. The second adhesive film 220 is typically adhered to the textile after sublimation printing to avoid melting the adhesive; however, the use of a transfer sheet and release adhesive contacted with the second adhesive while the opposing surface of the textile is sublimation printed can control flow of the melted second adhesive. For optimal results, it is desired that the imprinted ink or dye colors penetrate the textile yarns or threads downward from the imprinted surface so that upon cutting out the final design shape contrasting colors on the edges of the printed surface color or shade do not contrast with the original yarn or thread colors. This problem can be resolved by saturating the yarn or threads with dye top-to-bottom either with a heavier ink load or by dyeing the entire textile. Alternatively, the problem can be avoided by cutting out the finished image and weeding away the textile part to be discarded prior to dye sublimation printing of the final cut shape so the dye sublimation color is also directly transfers ink color to the cut edges. Although aspects of the disclosure are described with reference to sublimation printing, it will be appreciated that any process suitable for imparting colors (e.g., dye, pigment, and/or ink) to fabric or textiles may be employed in addition to or in lieu of sublimation printing, such as direct screen printing, gravure, offset, rotary, lithography, ink jet, thermal, and stereolithography.

In some embodiments, multi-color images can be created by assembling pre-colored cut materials of retroreflective and/or textile materials, which can be assembled into the desired overall design and shape.

In an optional second step, the first intermediate product 1100 is contacted under heat and pressure with the third adhesive 228, which is mounted on a transfer sheet 204 via a release adhesive 208 to form second intermediate product 1104. The first and second adhesives are collectively shown as adhesive layer 1108. The applied heat is sufficient to adhesively bond the first intermediate product 1100 to the third adhesive 228.

The temperature and pressure required to soften the third adhesive depends on the chemical properties of the adhesive. Typically, substantially enough heat is applied to at least soften, if not at least partially melt, the third adhesive. While not wanting to be bound by any theory, it is believed that embedding part of the textile fiber ends into the second and third adhesives (depending on the graphic configuration) substantially adhesively bonds the textile to the second adhesive by one or more of the following adhesive processes: mechanical, electrostatic, adsorption, chemisorption, diffusion, or a combination thereof. The pressure is at least sufficient to substantially mechanically interlock the second adhesive with the textile. The pressure, however, should not be too high to avoid pushing the second (or third) adhesive too far into and possibly through to the other side of the textile (or article to be decorated).

In an embodiment, the second and third adhesives soften and/or fully or partially melt at a process line temperature from about 50° C. to about 140° C. A process line temperature means the temperature applied during at least the applying of heat. In an embodiment, the pressure applied to embed the textile ends into the second adhesive is typically from about 0.1 bar to about 10 bar.

The appliqué can be applied to the substrate 612 by removing the release adhesive 208 and transfer sheet 204 and, under heat and pressure, adhering the third adhesive to the substrate 612.

Figure 11:
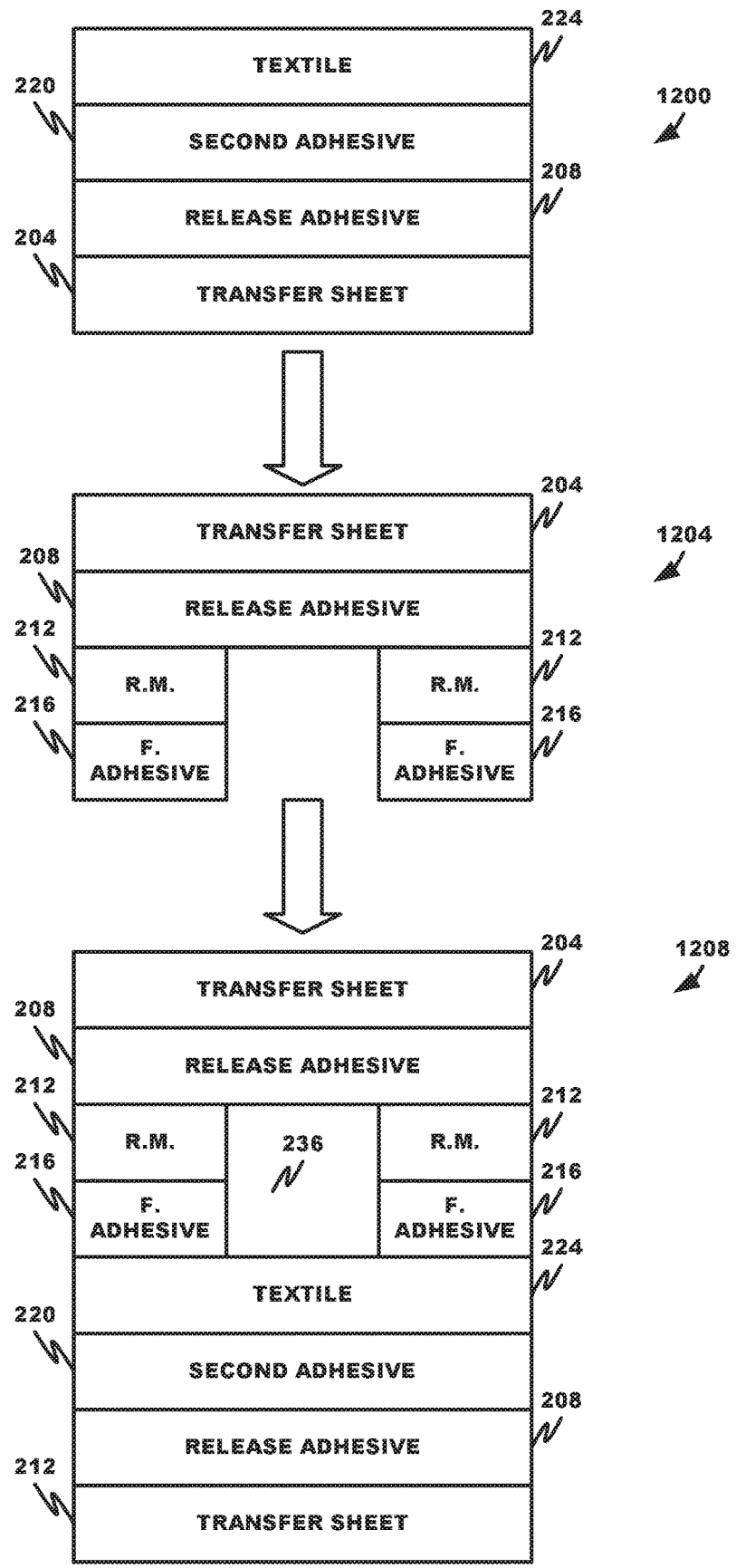
FIG. 11 depicts various intermediate and final appliqué structures according to an embodiment of this disclosure.
Figure 12:
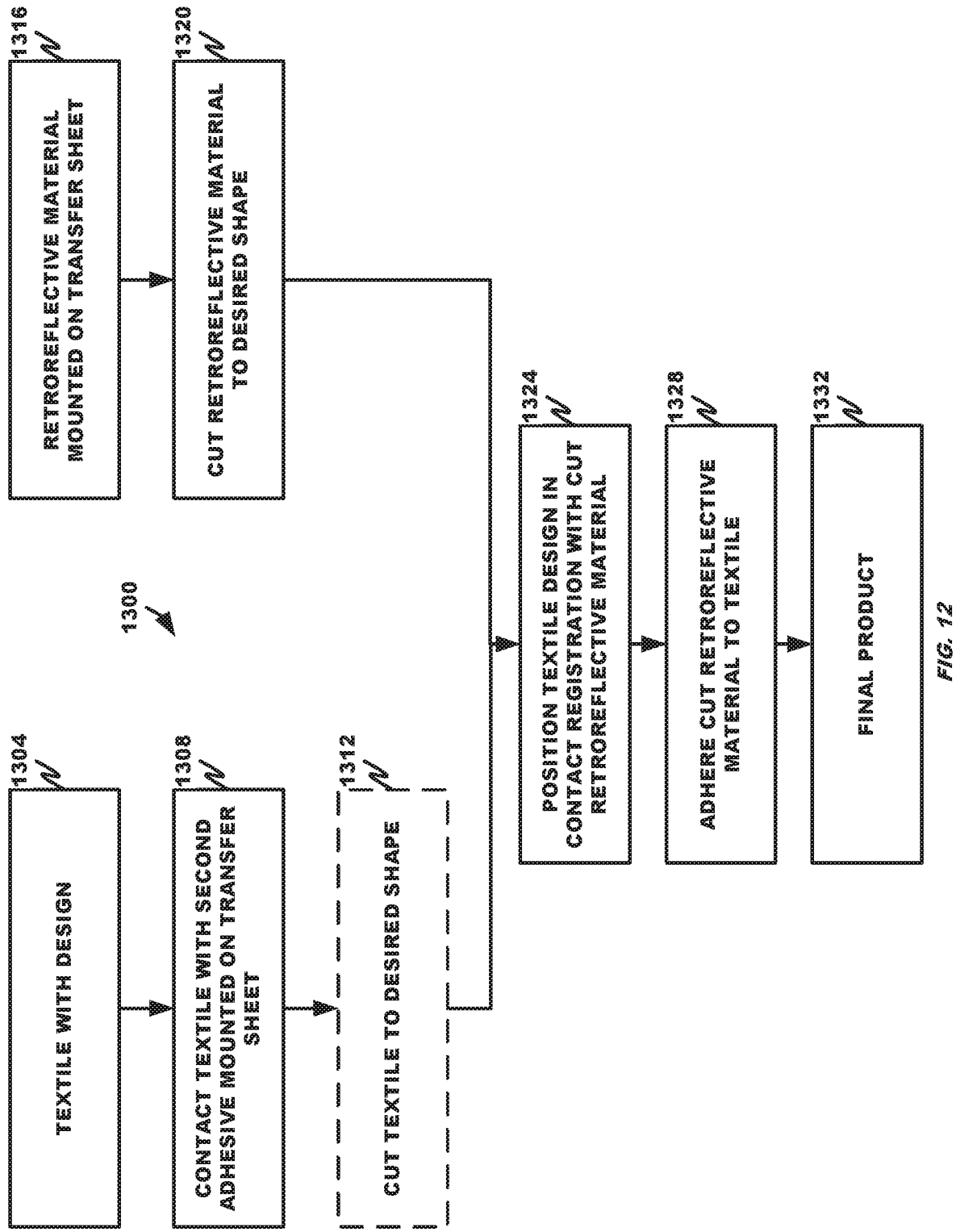
FIG. 12 depicts a process to manufacture an appliqué according to an embodiment of this disclosure.

A method 1300 in accordance with another embodiment will be discussed with reference to FIGS. 11 and 12. The manufacturing method can produce the appliqué 200.

In step 1304, the textile with the selected (multi-colored) design is provided. While any dying method may be used to provide the design, sublimation dye printing using a low, medium or high energy ink or dye is commonly employed. The textile can be sublimation printed before the second adhesive is contacted therewith. In that event, the second and optionally third adhesives are applied at a lower temperature in a subsequent step.

In step 1308, the textile is contacted or laminated under heat and pressure with the second adhesive mounted on a transfer sheet via a release adhesive to form the first intermediate product 1200. In some embodiments, the sublimation printing step may be conducted after the lamination. Typically, the sublimation printing temperature is above the softening point of the second adhesive. The second adhesive film and attached transfer sheet stabilize the intermediate product 1200 during sublimation printing and maintain it substantially flat and substantially dimensionally stable.

In optional step 1312, the first intermediate product 1200 is cut in registration to a desired shape by any suitable cutting technique.

In step 1316, the retroreflective material mounted on a transfer sheet via release adhesive is provided. The retroreflective material articles in FIGS. 13 and 15 depict various configurations of retroreflective material articles.

In step 1320, the retroreflective material article is cut in registration to a desired shape by any suitable cutting technique to form second intermediate product 1204. The registration process may be a mechanical and/or electro-optical guided registration process.

In both steps 1316 and 1320, the first intermediate product and the retroreflective material article are cut in registration with a selected design pattern for the final product or appliqué 200. The cutting is typically done using registration or fiducial marks printed on the textile or retroreflective material. Typically, the cutting process is one of laser or die cutting process.

In both cutting steps, a weeding process removes the excess material that is not part of the final shape. The weeding may be performed manually by a person using tools, for example a razor blade or other appropriate device, for removing the excess appliqué media while maintaining the graphic media of the final shape. In some embodiments, the weeding may be automatically performed using a programmed machine instead of manually by a person.

In step 1324, the cut first intermediate product 1200 is positioned in contact registration with the cut retroreflective material to form third intermediate product 1208.

In step 1328, the third intermediate product 1208 is laminated under heat and pressure to form the final product 1332, or applique 200. The lamination temperature is typically less than the sublimation printing temperature and the softening and melting temperatures of the second adhesive but above the softening and melting temperatures of the first adhesive. The lamination temperature is typically less than about 350, even more typically less than about 325, and even more typically less than about 275° F. The pressure is at least sufficient to substantially mechanically interlock the first adhesive with the textile to at least sufficiently mechanically interlock the textile with the first adhesive.

To maintain a sufficiently strong bond between the first adhesive and the second intermediate product without too much penetration of the adhesive into the fabric of the textile, the platen pressure can be important. For a Hix™ brand pneumatic lamination machine, the typical line pressure setting is at least about 50 psi, even more typically from about 50 to about 75 psi, and even more typically from about 50 to about 60 psi. The line pressure is a relative number and must be converted to direct applied pressure or "surface" pressure of the platen according to a formula known to those of ordinary skill in the art. The formula combines the line pressure, area of the heat press, and cylinder diameter and stroke of the machine. After the conversion, the direct surface applied pressure is typically at least about 6 psi, even more typically ranges from about 6 psi to about 15 psi, and even more typically from about 6 psi to about 7.5 psi. The typical residence or dwell time of a given segment of the elastomeric adhesive layer at these pressures typically ranges from about 5 to about 50 seconds, even more typically from about 7.5 to about 35 seconds, and even more typically from about 10 to about 30 seconds.

A number of variations and modifications of the disclosure can be used. It would be possible to provide for some features of the disclosure without providing others. For example, flock or other non-woven textiles can be used in place of a woven or knit textile in any of the embodiments disclosed herein.

The present disclosure, in various embodiments, configurations, or aspects, includes components, methods, processes, systems and/or apparatus substantially as depicted and described herein, including various embodiments, configurations, aspects, sub-combinations, and subsets thereof. Those of skill in the art will understand how to make and use the present disclosure after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate typical embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A three-dimensional mixed-media multi-colored graphic for attachment to a substrate, comprising:
   a non-retroreflective textile material comprising one of a woven, non-woven, or knit textile having opposing first and second textile surfaces, wherein the non-retroreflective textile material comprises a first plane of the three-dimensional mixed-media multi-colored graphic, and comprises one or more first colors, wherein the one or more first colors are based at least in part on sublimation printing/dyeing;
   a retroreflective material comprising one or a plurality of optically transparent beads and a metal layer or cube-corner sheeting and a metal layer, the retroreflective material having opposing first and second surfaces, wherein the retroreflective material comprises a second plane of the three-dimensional mixed-media multi-colored graphic different from the first plane, and comprises a second color, wherein the second color is different from at least one of the one or more first colors and different from a color of the metal layer,
   wherein the first surface of the retroreflective material exhibits a coefficient of retroreflection ($R_A$) not less than 70 cd/(lux·m$^2$) measured at an observation angle of 0.2 degrees and an entrance angle of −4 degrees and/or a total light return of not less than 10% for incident visible light at an entrance angle of −4 degrees, and
   wherein one of the first and second textile surfaces and one of the first and second surfaces are adhered to on another by an adhesive, wherein one of the non-retroreflective textile material and the retroreflective material comprises a void, wherein the other of the non-retroreflective textile material and the retroreflective material is a continuous base layer of the three-dimensional mixed-media multi-colored graphic and is viewable through the void and not viewable in areas of overlap, wherein the non-retroreflective textile material and the retroreflective material contribute to a design of the three-dimensional mixed-media multi-colored graphic that substantially corresponds to an original logo in color and design and is visually recognizable in high and low lighting conditions; and
   an attachment means on the second textile surface or the second surface of the continuous base layer adapted to attach the three-dimensional mixed-media multi-colored graphic to the substrate.

2. The three-dimensional mixed-media multi-colored graphic of claim 1, wherein the non-retroreflective textile material is a textured woven or knit textile.

3. The three-dimensional mixed-media multi-colored graphic of claim 1, wherein the retroreflective material comprises the plurality of optically transparent beads and the metal layer, the plurality of optically transparent beads having a first bead surface and a second bead surface, wherein the second bead surface comprises the metal layer and the first bead surface faces a viewer.

4. The three-dimensional mixed-media multi-colored graphic of claim 3, wherein the optically transparent beads of the plurality of optically transparent beads comprise a mean diameter from about 15 microns and 85 microns and a refractive index from about 1.5 to about 3.

5. The three-dimensional mixed-media multi-colored graphic of claim 1, wherein the retroreflective material comprises the cube-corner sheeting and the metal layer, the cube-corner sheeting having a first planar surface having an optional overlay film thereon and a second structured surface, wherein the second structured surface comprises the metal layer and the first surface faces a viewer.

6. The three-dimensional mixed-media multi-colored graphic of claim 1, wherein an $R_A$ of the first textile surface of the non-retroreflective textile material is not more than 20 cd/(lux·m$^2$) and/or a total light return of the first surface of the non-retroreflective textile material is less than 4%.

7. The three-dimensional mixed-media multi-colored graphic of claim 6, wherein the $R_A$ of the first textile surface is not more than 10 cd/(lux·m$^2$) and/or a total light return of the first surface of the non-retroreflective textile material is less than 2.5%.

8. The three-dimensional mixed-media multi-colored graphic of claim 1, wherein the adhesive is located between the second surface of the retroreflective material and the first textile surface, wherein the first textile surface is viewable through the void and not viewable in the areas of overlap.

9. The three-dimensional mixed-media multi-colored graphic of claim 1, wherein the adhesive is located between the second textile surface and the first surface of the retroreflective material, wherein the first surface is viewable through the void and not viewable in the areas of overlap.

10. The three-dimensional mixed-media multi-colored graphic of claim 1, the attachment means is an attachment adhesive and the substrate is apparel.

11. A three-dimensional mixed-media multi-colored graphic for attachment to a substrate, comprising:
   a non-retroreflective textile material comprising one of a woven, non-woven, or knit textile having opposing first and second textile surfaces, wherein the non-retroreflective textile material comprises a first plane of the three-dimensional mixed-media multi-colored graphic, and comprises one or more first colors, wherein the one or more first colors are based at least in part on sublimation printing/dyeing;
   a retroreflective material comprising one or a plurality of optically transparent beads and a metal layer or cube-corner sheeting and a metal layer, the retroreflective material having opposing first and second surfaces, wherein the retroreflective material comprises a second plane of the three-dimensional mixed-media multi-colored graphic different from the first plane, and comprises a second color, wherein the second color is different from at least one of the one or more first colors and different from a color of the metal layer,
   wherein the first surface of the retroreflective material has a retroreflective coefficient of retroreflection ($R_A$) of not less than 50 cd/(lux·m$^2$) and the first textile surface of the non-retroreflective textile material has a textile coefficient of retroreflection ($R_A$), wherein the $R_A$ is measured at an observation angle of 0.2 degrees and an entrance angle of −4 degrees, wherein the textile $R_A$ is no more than about 50% of the retroreflective $R_A$,
   wherein one of the first and second textile surfaces and one of the first and second surfaces are adhered to on another by an adhesive, wherein one of the non-retroreflective textile material and the retroreflective material comprises a void, wherein the other of the non-retroreflective textile material and the retroreflective material is a continuous base layer of the three-dimensional mixed-media multi-colored graphic and is viewable through the void and not viewable in areas of overlap, wherein the non-retroreflective textile material and the retroreflective material contribute to a design of the three-dimensional mixed-media multi-colored graphic that substantially corresponds to an original logo in color and design and is visually recognizable in high and low lighting conditions; and an attachment means on the second textile surface or the second surface of the continuous base layer adapted to attach the three-dimensional mixed-media multi-colored graphic to the substrate.

12. The three-dimensional mixed-media multi-colored graphic of claim 11, wherein the non-retroreflective textile material is a textured woven or knit textile.

13. The three-dimensional mixed-media multi-colored graphic of claim 11, wherein the retroreflective material comprises the plurality of optically transparent beads and the metal layer, the plurality of optically transparent beads having a first bead surface and a second bead surface, wherein the second bead surface comprises the metal layer and the first bead surface faces a viewer.

14. The three-dimensional mixed-media multi-colored graphic of claim 11, wherein the retroreflective material comprises the cube-corner sheeting and the metal layer, the cube-corner sheeting having a first planar surface having an optional overlay film thereon and a second structured surface, wherein the second structured surface comprises the metal layer and the first surface faces a viewer.

15. The three-dimensional mixed-media multi-colored graphic of claim 11, wherein the textile $R_A$ is not more than 20 cd/(lux·m$^2$).

16. The three-dimensional mixed-media multi-colored graphic of claim 15, wherein the retroreflective $R_A$ is not less than 70 cd/(lux·m$^2$) and the textile $R_A$ is not more than 10 cd/(lux·m$^2$).

17. The three-dimensional mixed-media multi-colored graphic of claim 11, wherein the adhesive is located between the second surface of the retroreflective material and the first textile surface, wherein the first textile surface is viewable through the void and not viewable in the areas of overlap.

18. The three-dimensional mixed-media multi-colored graphic of claim 11, wherein the adhesive is located between the second textile surface and the first surface of the retroreflective material, wherein the first surface is viewable through the void and not viewable in the areas of overlap.

19. The three-dimensional mixed-media multi-colored graphic of claim 11, the attachment means is an attachment adhesive and the substrate is apparel.

20. A three-dimensional mixed-media multi-colored graphic for attachment to a substrate, comprising:
a non-retroreflective textile material comprising one of a woven, non-woven, or knit textile having opposing first and second textile surfaces, wherein the non-retroreflective textile material comprises a first plane of the three-dimensional mixed-media multi-colored graphic, and comprises one or more first colors, wherein the one or more first colors are based at least in part on sublimation printing/dyeing;
a retroreflective material comprising one or a plurality of optically transparent beads and a metal layer or cube-corner sheeting and a metal layer, the retroreflective material having opposing first and second surfaces, wherein the retroreflective material comprises a second plane of the three-dimensional mixed-media multi-colored graphic different from the first plane, and comprises a second color, wherein the second color is different from at least one of the one or more first colors and different from a color of the metal layer, wherein the first surface of the retroreflective material has a coefficient of retroreflection ($R_A$) of at least 50 cd/(lux·m$^2$), the $R_A$ measured at an observation angle of 0.2 degrees and an entrance angle of −4 degrees, and has a retroreflective total light return and the first textile surface of the non-retroreflective textile material has a textile total light return, wherein the total textile Revlight return is for incident visible light at an entrance angle of −4 degrees, and the retroreflective total light return is at least about 75% greater than the textile total light return, wherein one of the first and second textile surfaces and one of the first and second surfaces are adhered to on another by an adhesive, wherein one of the non-retroreflective textile material and the retroreflective material comprises a void, wherein the other of the non-retroreflective textile material and the retroreflective material is a continuous base layer of the three-dimensional mixed-media multi-colored graphic and is viewable through the void and not viewable in areas of overlap, wherein the non-retroreflective textile material and the retroreflective material contribute to a design of the three-dimensional mixed-media multi-colored graphic that substantially corresponds to an original logo in color and design and is visually recognizable in high and low lighting conditions; and an attachment means on the second textile surface or the second surface of the continuous base layer adapted to attach the three-dimensional mixed-media multi-colored graphic to the substrate.

21. The three-dimensional mixed-media multi-colored graphic of claim 20, wherein the non-retroreflective textile material is a textured woven or knit textile.

22. The three-dimensional mixed-media multi-colored graphic of claim 20, wherein the retroreflective material comprises the plurality of optically transparent beads and the metal layer, the plurality of optically transparent beads having a first bead surface and a second bead surface, wherein the second bead surface comprises the metal layer and the first bead surface faces a viewer.

23. The three-dimensional mixed-media multi-colored graphic of claim 20, wherein the retroreflective material comprises the cube-corner sheeting and the metal layer, the cube-corner sheeting having a first planar surface having an optional overlay film thereon and a second structured surface, wherein the second structured surface comprises the metal layer and the first surface faces a viewer.

24. The three-dimensional mixed-media multi-colored graphic of claim 20, wherein the retroreflective total light return of is not less than 8% and the textile total light return is not more than 5%.

25. The three-dimensional mixed-media multi-colored graphic of claim 24, wherein the retroreflective total light return of is not less than 10% and the textile total light return is not more than 2.5%.

26. The three-dimensional mixed-media multi-colored graphic of claim 20, wherein the adhesive is located between the second surface of the retroreflective material and the first textile surface, wherein the first textile surface is viewable through the void and not viewable in the areas of overlap.

27. The three-dimensional mixed-media multi-colored graphic of claim 20, wherein the adhesive is located between the second textile surface and the first surface of the retroreflective material, wherein the first surface is viewable through the void and not viewable in the areas of overlap.

28. The three-dimensional mixed-media multi-colored graphic of claim 20, the attachment means is an attachment adhesive and the substrate is apparel.

* * * * *